(12) United States Patent
Lu

(10) Patent No.: US 10,819,205 B2
(45) Date of Patent: Oct. 27, 2020

(54) METHODS AND SYSTEMS FOR CONTROLLABLY MOVING MULTIPLE MOVEABLE STAGES IN A DISPLACEMENT DEVICE

(71) Applicant: The University of British Columbia, Vancouver (CA)

(72) Inventor: Xiaodong Lu, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 16/428,925

(22) Filed: May 31, 2019

(65) Prior Publication Data

US 2020/0014291 A1 Jan. 9, 2020

Related U.S. Application Data

(63) Continuation of application No. 15/881,719, filed on Jan. 26, 2018, now Pat. No. 10,348,178, which is a
(Continued)

(51) Int. Cl.
*H02K 41/02* (2006.01)
*H02K 41/03* (2006.01)
(Continued)

(52) U.S. Cl.
CPC ........... *H02K 41/031* (2013.01); *H02K 41/02* (2013.01); *H02K 41/03* (2013.01); *H02N 15/00* (2013.01);
(Continued)

(58) Field of Classification Search
CPC .. H02K 2201/18; H02K 41/03; H02K 41/031; H02K 41/02
(Continued)

(56) References Cited

U.S. PATENT DOCUMENTS

| 3,376,578 A | 4/1968 | Sawyer |
| 3,894,276 A | 7/1975 | Janssen |

(Continued)

FOREIGN PATENT DOCUMENTS

| CN | 201956875 | 8/2011 |
| EP | 1357434 | 10/2003 |

(Continued)

OTHER PUBLICATIONS

Cho et al., "Magnetic Field Analysis of 2-D Permanent Magnet Array for Planar Motor", IEEE Tran. On Magnetics, 2001, vol. 37 No. 5, pp. 3762-3766.
(Continued)

*Primary Examiner* — Thanh Lam
(74) *Attorney, Agent, or Firm* — Todd A. Rattray; Oyen Wiggs Green & Mutala LLP

(57) ABSTRACT

Aspects of the invention provide methods and systems for moving a plurality of moveable stages relative to a stator. The stator comprises a plurality of coils shaped to provide pluralities of coil trace groups where each coil trace group comprises a corresponding plurality of generally linearly elongated coil traces which extend across a stator tile. Each moveable stage comprises a plurality of magnet arrays. Methods and apparatus are provided for moving the moveable stages relative to the stator, where a magnet array from a first moveable stage and a magnet array from a second moveable stage both overlap a shared group of coil traces. For at least a portion of the time that the magnet arrays from the first and second moveable stages overlap the shared group of coil traces, currents are controllably driven in the shared coil trace group based on the positions of both the first and second moveable stages. The positions of the first and second moveable stages may be ascertained by feedback.

20 Claims, 17 Drawing Sheets

Related U.S. Application Data continuation of application No. 15/370,987, filed on Dec. 6, 2016, now Pat. No. 10,056,816, which is a continuation of application No. PCT/CA2015/050523, filed on Jun. 5, 2015.

(60) Provisional application No. 62/009,165, filed on Jun. 7, 2014.

(51) Int. Cl.
*H02N 15/00* (2006.01)
*H02P 8/00* (2006.01)
*H02K 16/02* (2006.01)
*H02P 25/066* (2016.01)

(52) U.S. Cl.
CPC ............... *H02P 8/00* (2013.01); *H02K 16/02* (2013.01); *H02K 2201/18* (2013.01); *H02P 25/066* (2016.02)

(58) Field of Classification Search
USPC ............... 310/12.06, 12.19, 12.21; 318/135
See application file for complete search history.

(56) References Cited

U.S. PATENT DOCUMENTS

| | | |
|---|---|---|
| 4,535,278 A | 8/1985 | Asakawa |
| 4,654,571 A | 3/1987 | Hinds |
| 4,835,424 A | 5/1989 | Hoffman et al. |
| 5,196,745 A | 3/1993 | Trumper |
| 5,334,892 A | 8/1994 | Chitayat |
| 5,925,956 A | 7/1999 | Ohzeki |
| 6,003,230 A | 12/1999 | Trumper et al. |
| 6,005,309 A | 12/1999 | Chitayat |
| 6,069,418 A | 5/2000 | Tanaka |
| 6,072,251 A | 6/2000 | Markle |
| 6,097,114 A | 8/2000 | Hazelton |
| 6,144,119 A | 11/2000 | Hazelton |
| 6,208,045 B1 | 3/2001 | Hazelton et al. |
| 6,252,234 B1 | 6/2001 | Hazelton et al. |
| 6,304,320 B1 | 10/2001 | Tanaka et al. |
| 6,339,266 B1 | 1/2002 | Tanaka |
| 6,437,463 B1 | 8/2002 | Hazelton et al. |
| 6,441,514 B1 | 8/2002 | Markle |
| 6,445,093 B1 | 9/2002 | Binnard |
| 6,452,292 B1 | 9/2002 | Binnard |
| 6,495,934 B1 | 12/2002 | Hayashi et al. |
| 6,504,160 B2 * | 1/2003 | Itoh ..................... G03F 7/70716 250/442.11 |
| 6,531,793 B1 * | 3/2003 | Frissen ................ H02K 41/031 310/12.06 |
| 6,590,355 B1 | 7/2003 | Kikuchi et al. |
| 6,650,079 B2 | 11/2003 | Binnard |
| 6,710,495 B2 | 3/2004 | Lipo et al. |
| 6,720,680 B1 | 4/2004 | Tanaka |
| 6,777,896 B2 | 8/2004 | Teng |
| 6,835,941 B1 | 12/2004 | Tanaka |
| 6,847,134 B2 | 1/2005 | Frissen et al. |
| 6,879,063 B2 | 4/2005 | Frissen et al. |
| 6,885,430 B2 | 4/2005 | Tanaka et al. |
| 6,949,844 B2 | 9/2005 | Cahill et al. |
| 6,987,335 B2 | 1/2006 | Korenaga |
| 7,025,005 B2 | 4/2006 | Shinozaki et al. |
| 7,057,370 B2 | 6/2006 | Touzov |
| 7,075,198 B2 | 7/2006 | Korenaga |
| 7,084,534 B2 | 8/2006 | Ohishi |
| 7,199,493 B2 | 4/2007 | Ohishi |
| 7,224,252 B2 | 5/2007 | Meadow, Jr. et al. |
| 7,227,284 B2 | 6/2007 | Korenaga |
| 7,436,135 B2 | 10/2008 | Miyakawa |
| 7,459,808 B2 * | 12/2008 | Hol ..................... G03F 7/70758 310/12.06 |
| 7,504,794 B2 * | 3/2009 | Sato ....................... H02K 41/03 318/649 |
| 7,550,890 B2 | 6/2009 | Kloeppel et al. |
| 7,696,653 B2 | 4/2010 | Tanaka |
| 7,808,133 B1 | 10/2010 | Widdowson et al. |
| 7,948,122 B2 | 5/2011 | Compter et al. |
| 8,031,328 B2 | 10/2011 | Asano et al. |
| 8,046,904 B2 | 11/2011 | Kloeppel et al. |
| 8,129,984 B2 | 3/2012 | Hosek et al. |
| 8,134,688 B2 | 3/2012 | Shibazaki |
| 8,384,317 B2 | 2/2013 | Shikayama et al. |
| 8,593,016 B2 | 11/2013 | Pelrine et al. |
| 8,686,602 B2 | 4/2014 | Pelrine et al. |
| 8,736,133 B1 | 5/2014 | Smith et al. |
| 9,202,719 B2 | 12/2015 | Lu et al. |
| 9,685,849 B2 * | 6/2017 | Lu ..................... H02K 1/2793 |
| 2002/0149270 A1 | 10/2002 | Hazelton |
| 2002/0149271 A1 | 10/2002 | Bartolotti |
| 2002/0180395 A1 | 12/2002 | Binnard |
| 2003/0085627 A1 | 5/2003 | Lipo et al. |
| 2004/0007920 A1 | 1/2004 | Teng |
| 2004/0140780 A1 | 7/2004 | Cahill et al. |
| 2005/0001579 A1 | 1/2005 | Touzov |
| 2005/0090902 A1 | 4/2005 | Masini |
| 2005/0093378 A1 | 5/2005 | Ohishi |
| 2005/0194843 A1 | 9/2005 | Korenaga |
| 2005/0194918 A1 | 9/2005 | Takeuchi |
| 2006/0175993 A1 | 8/2006 | Shibata et al. |
| 2006/0214518 A1 | 9/2006 | Ohishi |
| 2007/0035267 A1 | 2/2007 | Gao et al. |
| 2007/0046127 A1 | 3/2007 | Kloeppel et al. |
| 2007/0046221 A1 | 3/2007 | Miyakawa |
| 2007/0145831 A1 | 6/2007 | Antonius Theodorus Dams |
| 2008/0203828 A1 | 8/2008 | Compter et al. |
| 2008/0285005 A1 | 11/2008 | Gery et al. |
| 2008/0290741 A1 | 11/2008 | Cardon et al. |
| 2009/0058199 A1 | 3/2009 | Ito |
| 2009/0195195 A1 | 8/2009 | Huang |
| 2009/0251678 A1 | 10/2009 | Ohishi |
| 2009/0315413 A1 | 12/2009 | Iwatani et al. |
| 2010/0052437 A1 | 3/2010 | Froeschle et al. |
| 2010/0090545 A1 | 4/2010 | Binnard et al. |
| 2010/0167556 A1 | 7/2010 | Totsu et al. |
| 2010/0238425 A1 | 9/2010 | Binnard |
| 2011/0050007 A1 | 3/2011 | Kubo |
| 2011/0062901 A1 | 3/2011 | Busch |
| 2011/0101896 A1 | 5/2011 | Shikayama et al. |
| 2012/0091832 A1 | 4/2012 | Soderberg |
| 2012/0113405 A1 | 5/2012 | Yang et al. |
| 2012/0127447 A1 | 5/2012 | Yang et al. |
| 2012/0139455 A1 | 6/2012 | Tojo et al. |
| 2012/0300186 A1 | 11/2012 | Butler et al. |
| 2013/0140372 A1 | 6/2013 | Mahadeswaraswamy et al. |
| 2013/0164687 A1 | 6/2013 | Binnard et al. |
| 2013/0241575 A1 | 9/2013 | Finkler |
| 2014/0285122 A1 | 9/2014 | Lu et al. |
| 2015/0097498 A1 | 4/2015 | Hemati et al. |
| 2015/0137624 A1 | 5/2015 | Wu et al. |
| 2015/0338750 A1 | 11/2015 | Yang et al. |
| 2016/0065043 A1 | 3/2016 | Lu et al. |
| 2016/0161288 A1 | 6/2016 | Lu |

FOREIGN PATENT DOCUMENTS

| | | |
|---|---|---|
| JP | 4008006642 | 1/1996 |
| JP | 2002112526 | 4/2002 |
| JP | 2003209963 | 7/2003 |
| JP | 2004047981 | 2/2004 |
| JP | 2004254489 | 9/2004 |
| JP | 2012160408 | 8/2012 |
| TW | 201330485 | 7/2013 |
| WO | 2001018944 | 3/2001 |
| WO | 20050909202 | 9/2005 |
| WO | 2013059934 | 5/2013 |
| WO | 2015017933 | 2/2015 |
| WO | 2015179962 | 12/2015 |
| WO | 2015184553 | 12/2015 |
| WO | 2015188281 | 12/2015 |
| WO | 2016012157 | 1/2016 |
| WO | 2016012158 | 1/2016 |
| WO | 2016012159 | 1/2016 |

(56) References Cited

FOREIGN PATENT DOCUMENTS

| WO | 2016012160 | 1/2016 |
|----|------------|--------|
| WO | 2016012171 | 1/2016 |
| WO | 2016091441 | 6/2016 |

OTHER PUBLICATIONS

Filho, A.F.F., "Investigation of the Forces Produced by a New Electromagnetic Planar Actuator", Electric Machines and Drives Conference, IEMDC 2001. IEEE International, pp. 8-13.

Filho, A.F., "Analysis of a DC XY-Actuator", XIX International Conference on Electrical Machines—ICEM 2010, Rome.

Filho, A.F., "Development of a novel planar actuator", Ninth International Conference on Electrical Machines and Drives, Conference Publication No. 468, 1999.

Fujii et al., "X-Y Linear Synchronous Motors Without Force Ripple and Core Loss for Precision Two-Dimensional Drives", IEEE Transactions on Magnetics, vol. 38, No. 5, Sep. 2002.

Buckley et al., "Step-and-scan lithography using reduction optics", J. Vae. Sci. Technol. B 7 (6), Nov./Dec. 1989.

Hesse et al., "Interferometric Controlled Planar Nanopositioning System With 100 MM Circular Travel Range", ASPE 2011 Annual Meeting, Denver, Co.

Tomita et al., "Study on a surface-motor driven precise positioning system", Journal of Dynamic Systems, Measurement, and Control Sep. 1995, vol. 117/311-319.

Ueda et al., "A planar actuator with a small mover traveling over large yaw and translational dispalcements", IEEE Transactions on Magnetics, vol. 44, No. 5, May 2008.

Kajiyama et al., "Development of ironless type surface motor", XIX International Conference on Electrical Machines—ICEM 2010, Rome.

Shinno et al., "A Newly Developed Linear Motor-Driven Aerostatic X-Y Planar Motion Table System for Nano-Machining", Annals of the CIRP, 2007, 56/1:369-372.

Gao et al., "A surface motor-driven planar motion stage integrated with an XYθZ surface encoder for precision positioning", Precision Engineering, 2004, 28/3:329-337.

In et al., "Design of a planar-type high speed parallel mechanism positioning platform with the capability of 180 degrees orientation", Annals of the CIRP, 2008, 57/1:421-424.

Lee et al., "Dynamic Modeling and Control of a Ball-Joint-Like Variable-Reluctance Spherical Motor", Journal of Dynamic Systems, Measurement, and Control, 1996, 118/1:29-40.

Weck et al., "Design of a Spherical Motor with Three Degrees of Freedom", Annals of the CIRP, 2000, 49/1:289-294.

Hollis et al., "A six-degree-of-freedom magnetically levitated variable compliance fine-motion wrist: Design, modeling, control", IEEE Trans. Robot. Automat, 1991, 7/3:320-332.

Verma et al., "Six-axis nanopositioning device with precision magnetic levitation technology", IEEE Tran. On Mechatronics, 2004, 9/2:384-391.

Kim et al., "High-precision magnetic levitation stage for photolithography", Precision Engineering, 1998, 22/2:66-77.

Holmes et al., "The Long-Range Scanning Stage: a Novel Platform for Scanned-Probe Microscopy", Precision Engineering, 2000, 24/3:191-209.

Etxaniz et al., "Magnetic Levitated 2D Fast Drive", IEEJ Transactions on Industry Applications, 2006, 126/12:1678-1681.

Compter, J., "Electro-dynamic planar motor", Precision Engineering, 2003, 28/2: 171-180.

Jansen et al., "Modeling of magnetically levitated planar actuators with moving magnets", IEEE Tran. Magnetic, 2007, 43/1:15-25.

Trumper et al., "Magnet arrays for synchronous machines", IEEE Industry Applications Society Annual Meeting, 1993, 1:9-18.

Jansen et al., "Magnetically Levitated Planar Actuator with Moving Magnets", IEEE Tran. Ind. App.,vol. 44, No. 4, 2008.

Kim, W.J., "High-Precision Planar Magnetic Levitation", Massachusetts Institute of Technology, Jun. 1997.

Jansen, J.W., "Magnetically levitated planar actuator with moving magnets: Electromechanical analysis and design", IOP-EMVT, SenterNovem, an agency of the Dutch Ministry of Economic Affairs, 2007.

Khan et al., "A Long Stroke Electromagnetic XY Positioning Stage for Micro Applications", IEEE/ASME Transactions on Mechatronics, vol. 17, No. 5, Oct. 2012, pp. 866-875.

Xiaodong Lu et al.: 6D direct-drive technology for planar motion stages, CIRP Annals, vol. 61, No. 1, pp. 359-362, XP028511153, ISSN: 0007-8506, DOI: 10.1016/J.CIRP.2012.03.145.

* cited by examiner

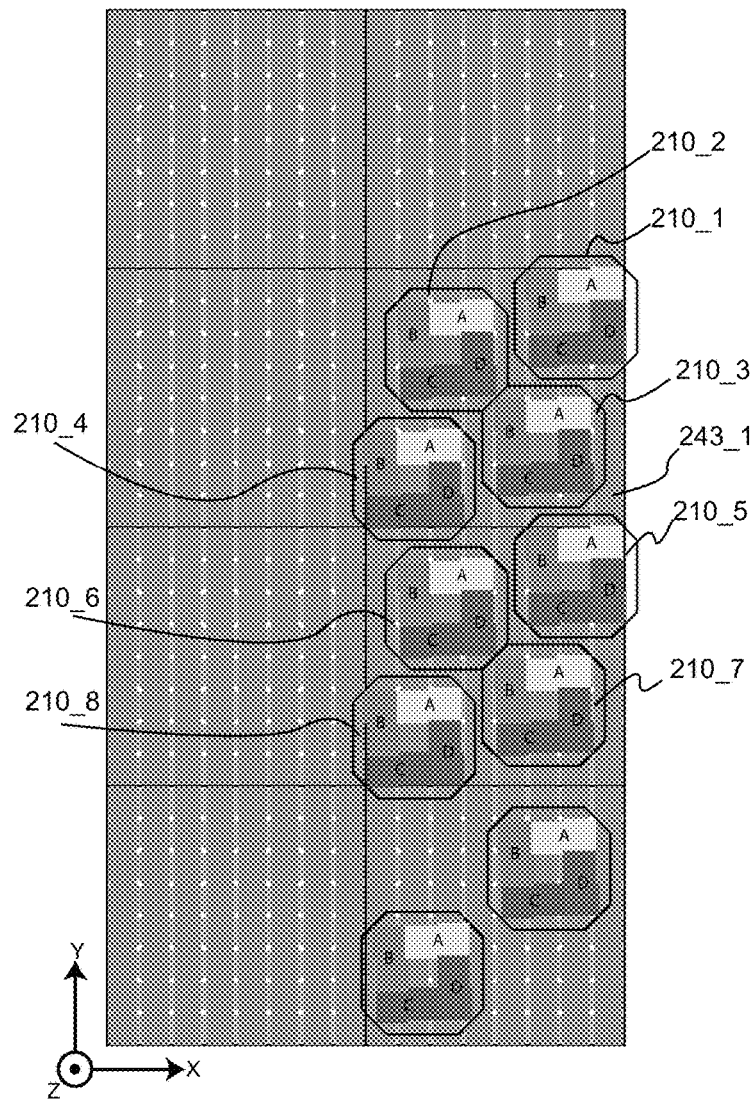
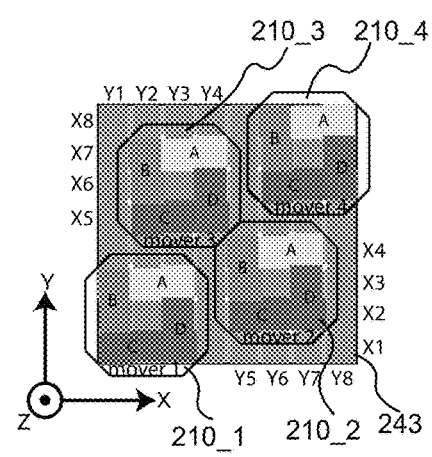
FIGURE 14A
FIGURE 14B

US 10,819,205 B2

METHODS AND SYSTEMS FOR CONTROLLABLY MOVING MULTIPLE MOVEABLE STAGES IN A DISPLACEMENT DEVICE

RELATED APPLICATIONS

This application is a continuation of U.S. application Ser. No. 15/881,719 entitled METHODS AND SYSTEMS FOR CONTROLLABLY MOVING MULTIPLE MOVEABLE STAGES IN A DISPLACEMENT DEVICE filed 26 Jan. 2018, which is a continuation of U.S. application Ser. No. 15/370,987 (now U.S. Pat. No. 10,056,816) entitled METHODS AND SYSTEMS FOR CONTROLLABLY MOVING MULTIPLE MOVEABLE STAGES IN A DISPLACEMENT DEVICE and having a filing date of 6 Dec. 2016, which is, in turn, a continuation of Patent Cooperation Treaty (PCT) application No. PCT/CA2015/050523 entitled METHODS AND SYSTEMS FOR CONTROLLABLY MOVING MULTIPLE MOVEABLE STAGES IN A DISPLACEMENT DEVICE and having an international filing date of 5 Jun. 2015, which, in turn, claims the benefit of the priority of U.S. application No. 62/009,165 entitled DISPLACEMENT DEVICES AND METHODS FOR FABRICATION, MEASUREMENT, USE AND CONTROL OF SAME and have a filing date of 7 Jun. 2014. U.S. application Ser. Nos. 15/881,719, 15/370,987, PCT application No. PCT/CA2015/050523 and US application No. 62/009,165 are all hereby incorporated herein by reference.

TECHNICAL FIELD

The invention relates to displacement devices. Particular embodiments provide systems and corresponding methods for moving multiple movable stages relative to a stator.

BACKGROUND

Motion stages (XY tables and rotary tables) are widely used in various manufacturing, inspection and assembling processes. A common solution currently in use achieves XY motion by stacking two linear stages (i.e. a X-stage and a Y-stage) together via connecting bearings.

A more desirable solution involves having a single moving stage capable of XY motion, eliminating additional bearings. It might also be desirable for such a moving stage to be able to provide at least some Z motion. Attempts have been made to design such displacement devices using the interaction between current-carrying coils and permanent magnets. Examples of efforts in this regard include the following: U.S. Pat. Nos. 6,003,230; 6,097,114; 6,208,045; 6,441,514; 6,847,134; 6,987,335; 7,436,135; 7,948,122; US patent publication No. 2008/0203828; W. J. Kim and D. L. Trumper, High-precision magnetic levitation stage for photolithography. *Precision Eng.* 22 2 (1998), pp. 66-77; D. L. Trumper, et al, "Magnet arrays for synchronous machines", IEEE Industry Applications Society Annual Meeting, vol. 1, pp. 9-18, 1993; and J. W. Jansen, C. M. M. van Lierop, E. A. Lomonova, A. J. A. Vandenput, "Magnetically Levitated Planar Actuator with Moving Magnets", IEEE Tran. Ind. App., Vol 44, No 4, 2008.

More recent techniques for implementing displacement devices having a moveable stage and a stator are described in:

PCT application No. PCT/CA2012/050751 (published under WO/2013/059934) entitled DISPLACEMENT DEVICES AND METHODS FOR FABRICATION, USE AND CONTROL OF SAME; and PCT application No. PCT/CA2014/050739 (published under WO/2015/017933) entitled DISPLACEMENT DEVICES AND METHODS AND APPARATUS FOR DETECTING AND ESTIMATING MOTION ASSOCIATED WITH SAME.

There is a general desire to provide displacement devices having characteristics that improve upon those known in the prior art. One area where there is room for improvement over existing displacement devices is in the controllable movement of multiple (two or more) moveable stages in a displacement device (e.g. relative to a single stator). It will be appreciated that there are multiple applications where it may be desirable (e.g. for efficiency or any other reasons) why it might be advantageous to be able to move multiple moveable stages in a displacement device. A challenge associated with controllably moving multiple moveable stages in a displacement device involves cross-coupling between the forces generated to move the multiple moveable stages. For example, forces generated by the displacement device to move a first moveable stage may cross-couple into one or more other moveable stages. There is a desire to move multiple moveable stages in a displacement device.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 14A and 14B respectively show queuing formations for multiple moveable stages of the FIG. 10 displacement device and methods for moving moveable stages into and out of such queuing formations according to particular embodiments.

DESCRIPTION

Figure 1A:
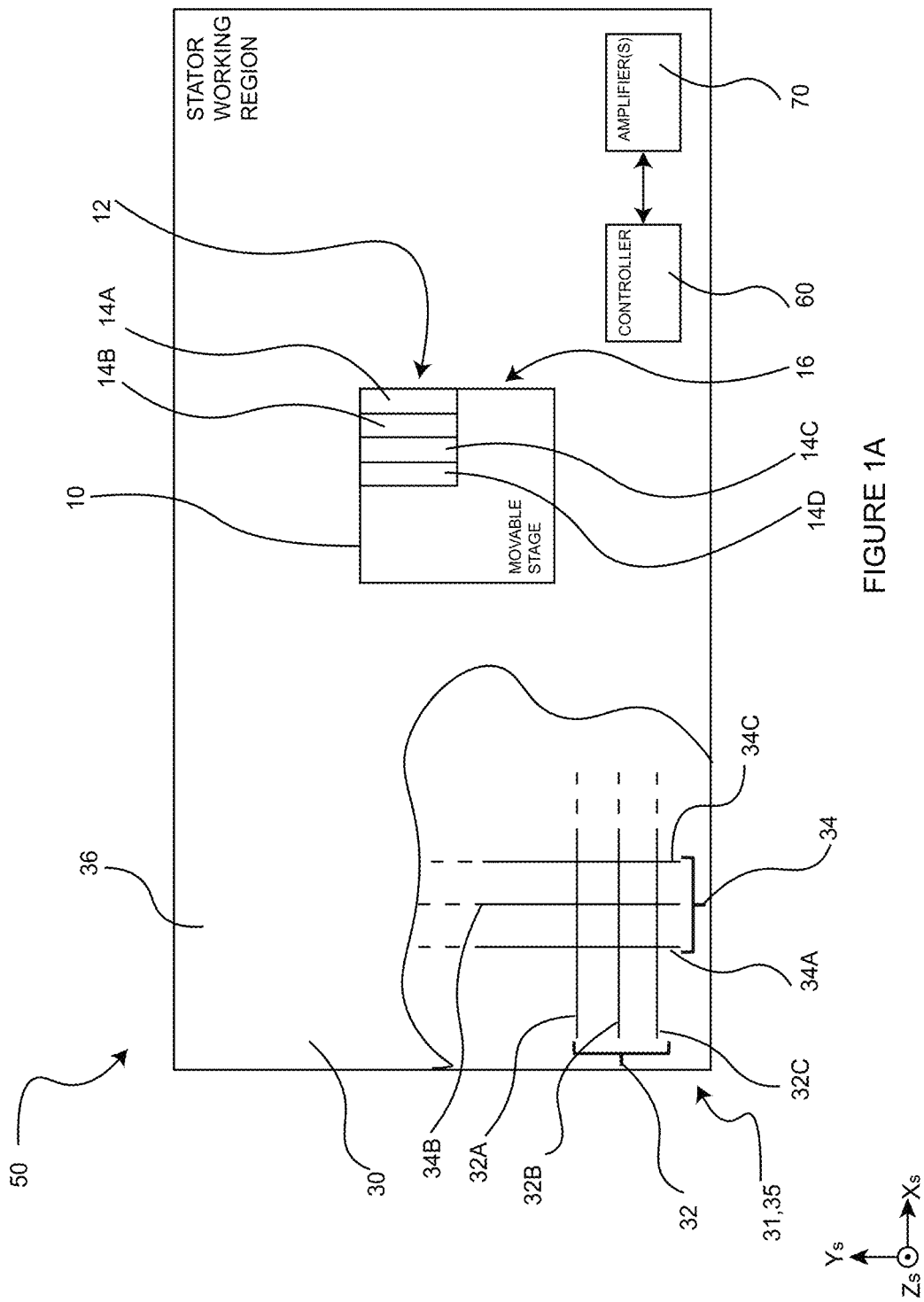
FIGS. 1A and 1B (together, FIG. 1) respectively depict a schematic partially cut-away top view and side cross-sectional views of a displacement device according to a particular embodiment of the invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide methods and systems for moving a plurality of moveable stages relative to a stator. The stator comprises a plurality of coils shaped to provide pluralities of coil trace groups where each coil trace group comprises a corresponding plurality of generally linearly elongated coil traces which extend across a stator tile. Each moveable stage comprises a plurality of magnet arrays. Methods and apparatus are provided for moving the moveable stages relative to the stator, where a magnet array from a first moveable stage and a magnet array from a second moveable stage both overlap a shared group of coil traces. For at least a portion of the time that the magnet arrays from the first and second moveable stages overlap the shared group of coil traces, currents are controllably driven in the shared coil trace group based on the positions of both the first and second moveable stages. The positions of the first and second moveable stages may be ascertained by feedback.

Aspects of the invention provide displacement devices which comprise a stator and one or more moveable stages. For brevity, moveable stages may also be referred to herein as movers. The stator comprises a plurality of electrically conductive coils shaped to provide pluralities of generally linearly elongated coil traces. Each moveable stage may be moveable relative to the stator within a two-dimensional working region of the displacement device. Each moveable stage may comprise one or more magnet arrays. In some embodiments, each magnet array comprises a plurality of magnetization segments, where each magnetization segment has a corresponding magnetization direction. Each magnet array may comprise at least two magnetization segments with different magnetization directions. One or more amplifiers may be connected to drive a plurality of currents in the plurality of coil traces. A controller may be connected to deliver control signals to the one or more amplifiers. The control signals may be used to control current driven by the one or more amplifiers into at least some of the plurality of coil traces. The currents controllably driven into the at least some of the plurality of coil traces create magnetic fields which cause corresponding magnetic forces on the one or more magnet arrays of the moveable stage, thereby moving the moveable stage relative to the stator (e.g. within the working region). In some embodiments, the magnetic forces associated with the interaction between the magnetic fields created by the currents in the at least some of the coil traces and the magnetic fields associated with the magnet arrays may attract the moveable stage toward the stator at all times when the controller is controlling the currents driven by the one or more amplifiers. In some embodiments, the magnetic forces associated with the interaction between the magnetic fields created by the currents in the at least some of the coil traces and the magnetic fields associated with the magnet arrays may force the moveable stage away from the stator to balance gravitational forces with an air gap at all times when the controller is controlling the currents driven by the one or more amplifiers.

Figure 1B:
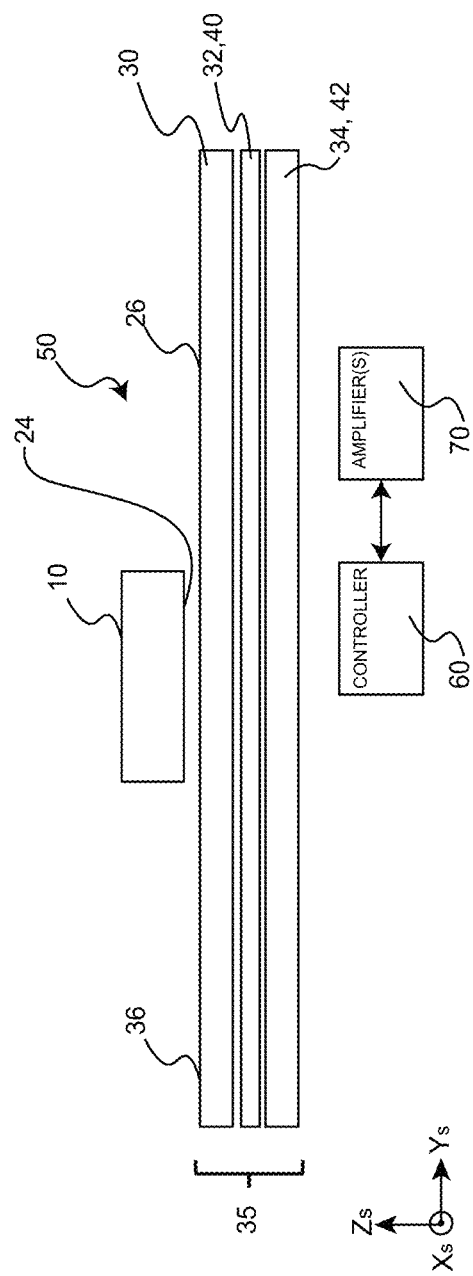

FIGS. 1A and 1B (together FIG. 1) respectively depict a partially cut-away top view and a side cross-sectional view of a displacement device 50 according to a particular embodiment. Displacement device 50 comprises a stator 30, a moveable stage 10, a controller 60 and one or more amplifiers 70. Moveable stage 10 may be controllably moved relative to stator 30 about a working region 36 of displacement device 50.

For purposes of describing the displacement devices disclosed herein, it can be useful to define a pair of coordinate systems—a stator coordinate system which is fixed to the stator (e.g. to stator 30 of FIG. 1A); and a stage coordinate system which is fixed to the moveable stage (e.g. moveable stage 10 of FIG. 1A) and moves with the moveable stage relative to the stator and the stator coordinate system. This description may use conventional Cartesian coordinates (x, y, z) to describe these coordinate systems, although, it will be appreciated that other coordinate systems could be used. For convenience and brevity, in this description and the associated drawings, the directions (e.g. x, y, z directions) in the stator coordinate system and the directions in the stage coordinate system may be shown and described as being coincident with one another—i.e. the stator-x, stator-y and stator-z directions may be shown as coincident with stage-x, stage-y and stage-z directions, respectively. Accordingly, this description and the associated drawings may refer to directions (e.g. x, y, and/or z) to refer to directions in both or either of the stator and stage coordinate systems. However, it will be appreciated from the context of the description herein that in some embodiments and/or circumstances, the moveable stage (e.g. moveable stage 10) may move relative to the stator (e.g. stator 30) such that these stator and stage directions are no longer coincident with one another. In such cases, this disclosure may adopt the convention of using the terms stator-x, stator-y and stator-z to refer to directions and/or coordinates in the stator coordinate system and the terms stage-x, stage-y and stage-z to refer to directions and/or coordinates in the stage coordinate system. In this description and the associated drawings, the symbols Xm, Ym and Zm may be used to refer respectively to the stage-x, stage-y and stage-z directions, the symbols Xs, Ys and Zs may be used to refer respectively to the stator-x, stator-y and stator-z directions and the symbols X, Y and Z may be used to refer respectively to either or both of the stage-x, stage-y and stage-z and/or stator-x, stator-y and stator-z directions. In some embodiments, during normal operation, the stage-z and stator-z directions are approximately in the same direction (e.g. within ±30° in some embodiments; within ±10° in some embodiments; and within ±2° in some embodiments).

In some embodiments, the stator-x and stator-y directions are non-parallel. In particular embodiments, the stator-x and stator-y directions are generally orthogonal. In some embodiments, the stage-x and stage-y directions are non-parallel. In particular embodiments, the stage-x and stage-y directions are generally orthogonal.

Controller 60 and amplifiers 70 may be configured and connected for controllably moving moveable stage 10 relative to stator 30 in working region 36. For example, controller 60 may be configured to generate control signals and connected to provide such control signals to amplifiers 70. Amplifiers 70 may be connected to drive currents in coil traces 32, 34. In response to the control signals from controller 60, amplifiers 70 may drive current in coil traces 32, 34 of stator 30 to effect movement of moveable stage 10 relative to stator 30. In some embodiments, controller 60 is configured to move moveable stage 10 to a desired position, $(x_r, y_r)$, within working region 36, where $x_r$ is a desired position of moveable stage 10 in the stator-x direction and $y_r$ is a desired position of the moveable stage in the stator-y direction. Unless the context dictates otherwise, throughout this disclosure and the accompanying claims, when referring to a position of a moveable stage, a location of a moveable stage, movement of a moveable stage generally within a working region and/or the like, such position, location, movement and/or the like should be understood to refer to the position, location, movement and/or the like of a reference point on the moveable stage. Such reference point may be, but is not limited to, a point at the center of the magnet array assembly of the moveable stage. Such reference point could be some other location on the moveable stage. Generally, the desired position $(x_r, y_r)$ is a function of time, t, and represents where a moveable stage should be ideally located at each time, t.

The FIG. 1 displacement device 50 and its components (e.g. moveable stage 10, stator 30, controller 60, amplifiers 70 and/or the like) represent generalized embodiments of a displacement device and its components which is useful for describing the principles of operation of displacement devices according to the various embodiments described herein. Further embodiments of displacement devices and/or their components described herein may use similar reference numerals (e.g. with a preceding digit, a trailing symbol, a trailing letter and/or a trailing number) to those used to describe displacement device 50 and/or its components. Unless the context or description dictates otherwise, such displacement devices and/or their components may exhibit features and/or characteristics which may be similar to the features and characteristics of displacement device 50 and/or its components (or vice versa). For example, moveable stages 110A, 210_2 described in more detail below are moveable stages according to particular embodiments of the invention. Unless the context or description dictates otherwise, moveable stages 110A, 210_2 may have features and/or characteristics similar to those discussed herein for moveable stage 10 (or vice versa). As another example, stators 130, 230 described in more detail below are stators according to particular embodiments of the invention. Unless the context or description dictates otherwise, stators 130, 230 may have features and/or characteristics similar to those discussed herein for stator 30. Further, unless the context or description dictates otherwise, it should also be understood that when referring to features and/or characteristics of displacement device 50 and/or its components, the corresponding description should be understood to apply to any of the particular embodiments of displacement devices and/or their components.

Moveable Stage

Figure 2:
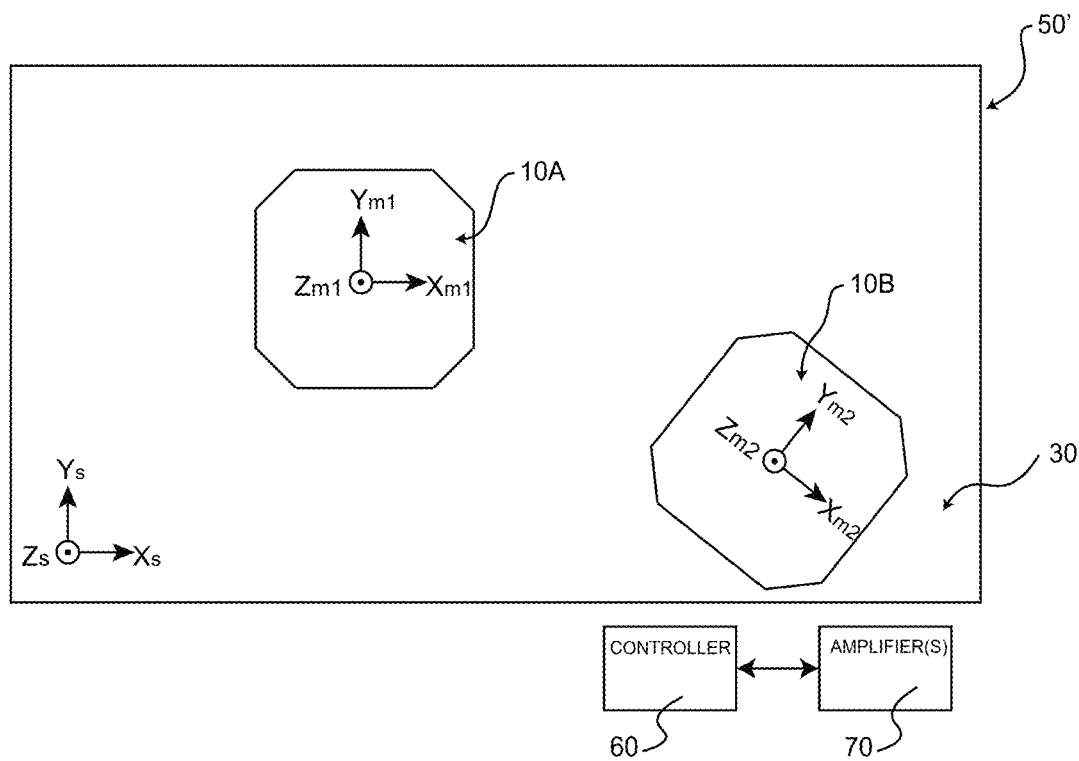
FIG. 2 is a top view of a displacement device which comprises a plurality of moveable stages.

In the FIG. 1 embodiment, displacement device 50 is shown with a single moveable stage 10. In general, however, displacement device 50 may comprise a plurality of moveable stages, each of which may be similar to moveable stage 10 and each of which may be controlled by controller 60 using amplifier(s) 70 to drive currents in coil traces 32, 34 as described herein. FIG. 2 shows a top view of displacement device 50', which comprises a plurality (e.g. two) moveable stages 10A, 10B. Controller 60 may be configured to generate control signals for controllably moving both moveable stages 10A, 10B. In other respects, displacement device 50' may be substantially similar to the FIG. 1 displacement device 50. By way of non-limiting example, each of moveable stages 10A, 10B may have similar features and/or characteristics to moveable stage 10 of displacement device 50 and stator 30 of displacement device 50' may have similar features and/or characteristics to stator 30 of displacement device 50. FIG. 2 shows that moveable stages 10A, 10B need not be aligned with one another. Consequently, each moveable stage 10A, 10B may be described using its own corresponding stage coordinate system. In the case shown in FIG. 2, the stage directions $X_{m1}/Y_{m1}/Z_{m1}$ define the stage coordinate system for moveable stage 10A and the stage directions $X_{m2}/Y_{m2}/Z_{m2}$ define the stage coordinate system for moveable stage 10B. Displacement device 50' can be built to operate with any suitable number of moveable stages 10. In some embodiments, displacement device 50' comprises three moveable stages. In some embodiments, displacement device 50' may comprise dozens to hundreds of moveable stages. In some embodiments still, displacement device 50' may comprise thousands of moveable stages.

Referring back to FIG. 1, moveable stage 10 comprises a magnet array assembly 16 which comprises one or more magnet arrays 12. Magnet array assembly 16 should be understood to comprise the combination of the one or more individual magnet arrays 12. Each magnet array 12 may comprise a corresponding plurality of magnetization segments 14A, 14B, 14C, 14D . . . (collectively, magnetization segments 14), each magnetization segment 14 having a corresponding magnetization direction. In some embodiments, the magnetization segments 14 of a particular magnet array 12 have at least two magnetization directions that are different from one another. In the FIG. 1 embodiment, moveable stage 10 comprises a first magnet array 12 having a plurality of corresponding first magnetization segments 14. Moveable stage 10 may be located adjacent to (e.g. atop) stator 30. As discussed above, in some embodiments, moveable stage 10 may be attracted toward (and bear against) stator 30 when controller 60 is controlling the currents driven by amplifiers 70; and, in some embodiments, moveable stage 10 is forced away from stator 30 (e.g. to provide an air gap between stator 30 and moveable stage 10) when controller 60 is controlling the currents driven by amplifiers 70. In the illustrated embodiment, for the sake of generality, moveable stage 10 comprises an optional stage bearing surface 24 that is generally planar (with a normal in the stage-z direction) and which may bear against an optional stator bearing surface 26 that is generally planar (with a normal in the stator-z direction) in embodiments where moveable stage is attracted toward stator 30.

One type of magnet array assembly 16 that can be used with any of the displacement devices disclosed herein is referred to as an elongated segment magnet array assembly 16. An elongated segment magnet array assembly 16 comprises one or more elongated segment magnet arrays 12, wherein each such magnet array 12 comprises plurality of linearly elongated magnetization segments 14 (e.g. elongated in a stage-x direction or a stage-y direction), with each magnetization segment 14 having a corresponding magnetization direction that is generally orthogonal to its elongation direction. At least two of the magnetization segments 14 in each magnet array 12 may have magnetization directions that are different from one another.

In some embodiments, moveable stage 10 comprises an elongated segment magnet array 16 which in turn comprises four elongated segment magnet arrays 12 (first, second, third and fourth magnet arrays 12). A first magnet array 12 in such an elongated segment magnet array assembly 16 may comprise a plurality of linearly elongated first magnetization segments 14 (e.g. elongated in a stage-x direction), with each first magnetization segment 14 having a corresponding magnetization direction that is generally orthogonal to the stage-x direction. At least two of the first magnetization segments 14 may have magnetization directions that are different from one another. The first magnetization directions of the first magnetization segments 14 may exhibit a first spatial period $\lambda_1$ (also referred to herein as $\lambda_y$) over a stage-y direction width of the first magnet array 12. In some embodiments, the stage-y direction width of the first magnet array 12 is generally equal to $\lambda_1$, so that the first magnetization directions of the first magnetization segments 14 exhibit a single first spatial period $\lambda_1$ over the stage-y direction width of the first magnet array 12. In some embodiments, the first magnetization directions of the first magnetization segments 14 exhibit multiple (e.g. an integer number of) first spatial periods $\lambda_1$ which repeat over the stage-y direction width of the first magnet array 12.

Similar to the first magnet array 12, the second magnet array 12 may comprise a plurality of linearly elongated second magnetization segments 14. However, the second magnetization segments 14 may be linearly elongated in the stage-y direction (e.g. non-parallel to the stage-x direction in some embodiments or generally orthogonal to the stage-x direction in some embodiments). Each second magnetization segment 14 has a corresponding second magnetization direction that is generally orthogonal to the stage-y direction and at least two of the second magnetization segments 14 have second magnetization directions that are different from one another. The second magnetization directions of the second magnetization segments 14 may exhibit a second spatial period $\lambda_2$ (also referred to herein as $\lambda_x$) over a stage-x direction width of the second magnet array 12. In some embodiments, the stage-x direction width of the second magnet array 12 is generally equal to $\lambda_2$, so that the second magnetization directions of the second magnetization segments 14 exhibit a single second spatial period $\lambda_2$ over the stage-x direction width. In other embodiments, the second magnetization directions of the second magnetization segments 14 exhibit multiple second spatial periods $\lambda_2$ which repeat over the stage-x direction width. In some embodiments, the first spatial period $\lambda_1=\lambda_y$ is equal to the second spatial period $\lambda_2=\lambda_x$ and they may both be referred to as the spatial period $\lambda$.

Similar to the first magnet array 12, the third magnet array 12 may comprise a plurality of third magnetization segments 14 linearly elongated in the stage-x direction, where each third magnetization segment 14 has a corresponding third magnetization direction that is generally orthogonal to the stage-x direction and at least two of the third magnetization segments 14 have third magnetization directions that are different from one another. The third magnetization directions of the third magnetization segments 14 may exhibit the first spatial period $\lambda_1=\lambda_y$ (or a unique third spatial period $\lambda_3$) over a stage-y direction width of the third magnet array 12. In some embodiments, the stage-y direction width of the third magnet array 12 is generally equal to $\lambda_1$ (or $\lambda_3$), so that the third magnetization directions of the third magnetization segments 14 exhibit a single first spatial period $\lambda_1$ (or single third spatial period $\lambda_3$) over the stage-y direction width. In other embodiments, the third magnetization directions of the third magnetization segments 14 exhibit multiple first spatial periods $\lambda_1$ (or multiple third spatial periods $\lambda_3$) which repeat over the stage-y direction width.

Similar to the second magnet array 12, the fourth magnet array 12 may comprise a plurality of fourth magnetization segments 14 linearly elongated in the stage-y direction, where each fourth magnetization segment 14 has a corresponding fourth magnetization direction that is generally orthogonal to the stage-y direction and at least two of the fourth magnetization segments 14 have fourth magnetization directions that are different from one another. The fourth magnetization directions of the fourth magnetization segments 14 may exhibit the second spatial period $\lambda_2=\lambda_x$ (or a unique fourth spatial period $\lambda_4$) over a stage-x direction width of the fourth magnet array 12. In some embodiments, the stage-x direction width of the fourth magnet array 12 is generally equal to $\lambda_2$ (or $\lambda_4$), so that the fourth magnetization directions of the fourth magnetization segments 14 exhibit a single second spatial period $\lambda_2$ (or single fourth spatial period $\lambda_4$) over the stage-x direction width. In other embodiments, the fourth magnetization directions of the fourth magnetization segments 14 exhibit multiple second spatial periods $\lambda_2$ (or multiple fourth spatial periods $\lambda_4$) which repeat over the stage-x direction width.

Figure 3A:
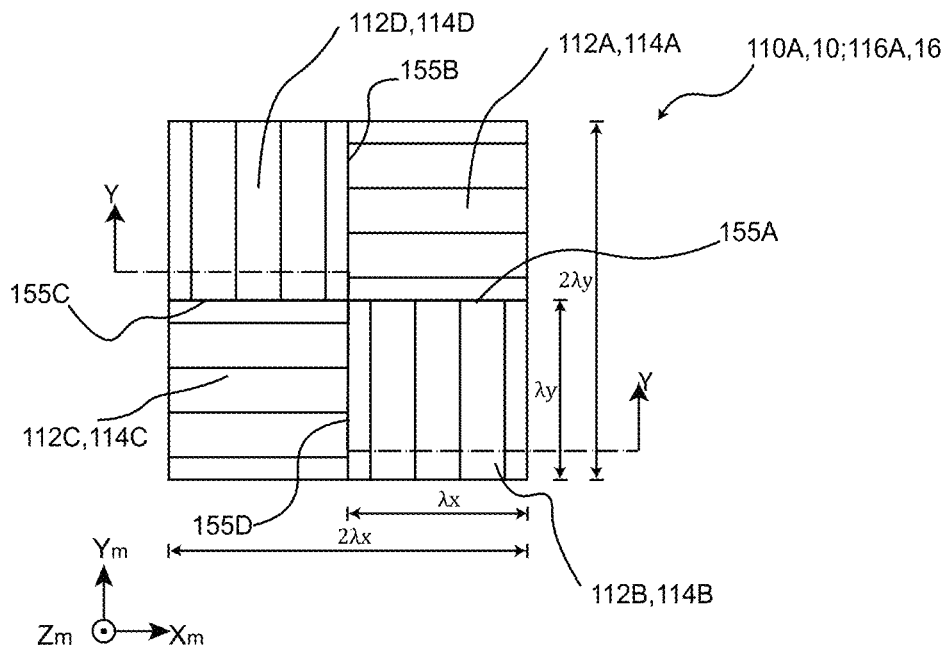
FIGS. 3A and 3B are each a schematic top view of a magnet array assembly comprising a plurality of elongated segment magnet arrays according to a particular embodiment.
Figure 3B:
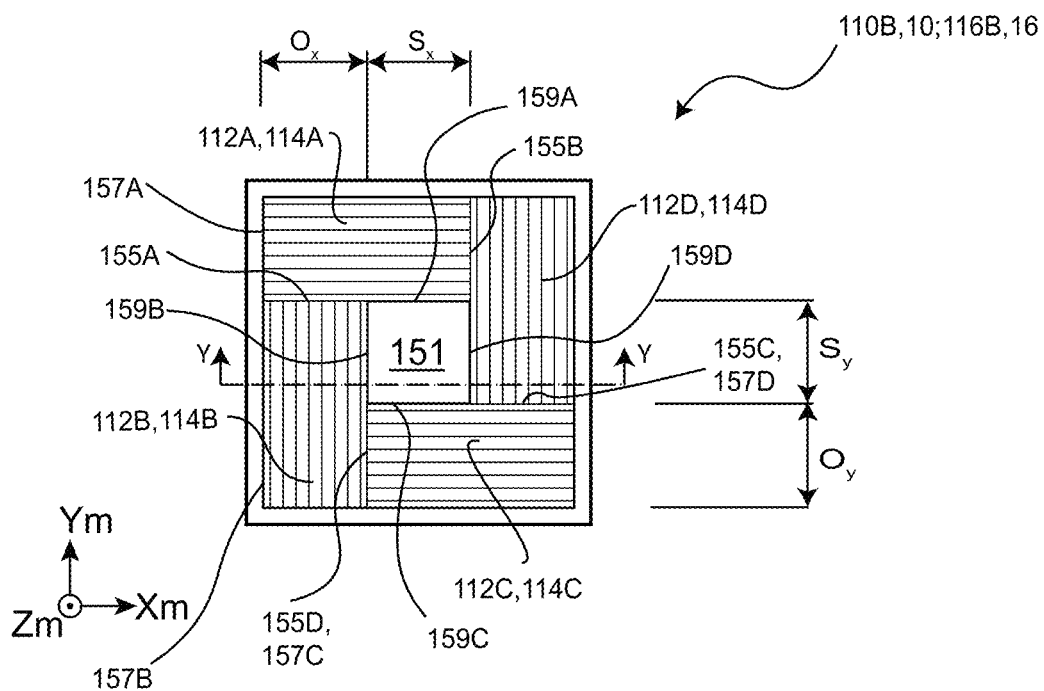

FIGS. 3A and 3B respectively depict partial schematic top views of moveable stages 110A, 110B incorporating magnet array assemblies 116A, 116B according to particular embodiments which may be used as magnet array assemblies 16 of moveable stage 10 (or any other moveable stages described herein) according to particular embodiments. Each of magnet array assemblies 116A, 116B comprises a plurality of elongated segment magnet arrays 112. In the illustrated embodiment, each of magnet array assemblies 116A, 116B comprise four elongated segment magnet arrays 112A, 112B, 112C, 112D (collectively, magnet arrays 112) which include a first magnet array 112A comprising magnetization segments 114A elongated in the stage-x direction, second magnet array 112B comprising magnetization segments 114B elongated in the stage-y direction, third magnet array 112C comprising magnetization segments 114C elongated in the stage-x direction and fourth magnet array 112D comprising magnetization segments 114D elongated in the stage-y direction. Because of their elongation directions, first and third magnet arrays 112A, 112C may be referred to as x-magnet arrays and their corresponding magnetization segments 114A, 114C may be referred to herein as x-magnetization segments and second and fourth magnet arrays 112B, 112D may be referred to as y-magnet arrays and their corresponding magnetization segments 114B, 114D may be referred to herein as y-magnetization segments. Other than for their locations and/or orientations, any of magnet arrays 112 in any one of magnet array assemblies 116A, 116B and/or in any one of moveable stages 110A, 110B may be substantially similar to one another. In this way, magnet array assemblies 116A, 116B and moveable stages 110A, 110B may be 90° rotationally symmetric about a stage-z oriented axis located at the stage-x-stage-y center of magnet array assemblies 116A, 116B and/or moveable stages 110A, 110B.

Although their individual magnet arrays 112 may be similar to one another, magnet array assemblies 116A, 116B and moveable stages 110A, 110B of the FIGS. 3A and 3B embodiments have layouts which are similar to one another in some respects and differ from one another in other respects. In the case of both magnet array assemblies 116A, 116B, a stage-x oriented edge of first magnet array 112A abuts against a stage-x oriented edge of second magnet array 112B (at abutment 155A), a stage-y oriented edge of the first magnet array 112A abuts against a stage-y oriented edge of the fourth magnet array 112D (at abutment 155B), a stage-x oriented edge of third magnet array 112C abuts against a stage-x oriented edge of the fourth magnet array 112D (at abutment 155C), and a stage-y oriented edge of the third magnet array 112C abuts against a stage-y oriented edge of the second magnet array 112B (at abutment 155D). Further, in the case of both magnet array assemblies 116A, 116B, the peripheral edges of magnet arrays 112 are aligned with one another to provide magnet array assemblies 116A, 116B with a generally rectangular peripheral shape (from the top plan view). In particular, the stage-y oriented peripheral edges of first and second magnet arrays 112A, 112B and the stage-y oriented peripheral edges of third and fourth magnet arrays 112C, 112D are aligned with one another in the stage-y direction. Further, the stage-x oriented peripheral edges of the first and fourth magnet arrays 112A, 112D and the stage-x oriented peripheral edges of second and third magnet arrays 112B, 112C are aligned with one another in the stage-x direction.

In some embodiments, these abutments and/or peripheral edge alignments are not necessary and magnet array assemblies 16 may comprise as few as one elongated segment magnet array 12 or a plurality of elongated segment magnet arrays 12 which are spaced apart from one another (i.e. non-abutting), which have non-aligned peripheral edges and/or which abut one another with different abutment and/or alignment relationships. For example, in some embodiments, the stage-y oriented peripheral edges of first and second magnet arrays 112A, 112B and the stage-y oriented peripheral edges of third and fourth magnet arrays 112C, 112D are not aligned with one another in the stage-y direction; and in some embodiments, the stage-x oriented peripheral edges of the first and fourth magnet arrays 112A, 112D and the stage-x oriented peripheral edges of second and third magnet arrays 112B, 112C are not aligned with one another in the stage-x direction.

The layout of magnet array assembly 116B differs from the layout of magnet array assembly 116A in that, for magnet array assembly 116B: corresponding stage-y oriented edges 157A, 157C of first and third magnet arrays 112A, 112C are offset from one another in the stage-x direction (by an offset Ox) and adjacent stage-x oriented edges 159A, 159C of first and third magnet arrays 112A, 112C are spaced apart from one another in the stage-y direction (by a first space Sy); and corresponding stage-x oriented edges 157B, 157D of second and fourth magnet arrays 112B, 112D are offset from one another in the stage-y direction (by an offset Oy) and adjacent stage-y oriented edges 159B, 159D of second and fourth magnet arrays 112B, 112D are spaced apart from one another in the stage-x direction (by a second space Sx). It can be seen from FIG. 3B, that for magnet array assembly 116B, the stage-x dimensions of the first and third magnet arrays 112A, 112C are larger than their corresponding stage-y dimensions, while the stage-y dimensions of the second and fourth magnet arrays 112B, 112D are larger than their corresponding stage-x dimensions. These offsets Ox, Oy and spaces Sx, Sy give rise to a non-magnetized space 151 (with dimensions Sx by Sy) in the center of magnet arrays assembly 116B. The layout of magnet array assembly 116B may be advantageous (relative to the layout of magnet array assembly 116A) because active coil traces interacting closely with magnet array 112A may generate relatively little coupling force on the magnet array 112C, and vice versa in magnet array assembly 116B as compared to magnet array assembly 116A; and active coil traces interacting closely with magnet array 112B generate little coupling force on the magnet array 112D, and vice versa in magnet array assembly 116B as compared to magnet array assembly 116A.

The layout of magnet array assembly 116A differs from the layout of magnet array assembly 116B in that, for magnet array assembly 116A: the stage-x oriented edges of the first and second magnet arrays 112A, 112B (i.e. the stage-x oriented edges that provide abutment 155A) have the same stage-x dimension; the stage-y-oriented edges of the first and fourth magnet arrays 112A, 112D (i.e. the stage-y oriented edges that provide abutment 155B) have the same stage-y dimension; the stage-x oriented edges of the third and fourth magnet arrays 112C, 112D (i.e. the stage-x oriented edges that provide abutment 155C) have the same stage-x dimension; and the stage-y-oriented edges of the second and third magnet arrays 112B, 112C (i.e. the stage-y oriented edges that provide abutment 155D) have the same stage-y dimension. Further, with these dimensions (and the above-described abutment and peripheral edge alignment features) magnet array assembly 116A does not have a space that is analogous to space 151 of magnet array assembly 116B. The layout of magnet array assembly 116A may be advantageous (relative to the layout of magnet array 116B) because the magnet array assembly footprint (in the stage-x and stage-y directions) is fully utilized for magnetic field generation.

Another difference between magnet array assemblies 116A, 116B is that for magnet array assembly 116A, the magnet array 112A that is furthest in the positive stage-x direction and furthest in the positive stage-y direction comprises magnetization segments 114A which are elongated in the stage-x direction and the other magnet arrays 112B, 112C, 112D alternate between having magnetization segments 114B, 114C, 114D elongated in the stage-y and stage-x directions. In contrast, for magnet array assembly 116B, the magnet array 112D that is furthest in the positive stage-x direction and furthest in the positive stage-y direction comprises magnetization segments 114D which are elongated in the stage-y direction and the other magnet arrays 112A, 112B, 112C alternate between having magnetization segments 114A, 114B, 114C elongated in the stage-x and stage-y directions. In this description: magnet array assemblies, like magnet array assembly 116A of FIG. 3A, which have a magnet array that is furthest in the positive stage-x direction and furthest in the positive stage-y direction and which comprises magnetization segments which are elongated in the stage-x direction may be referred to as right-handed magnet array assemblies; and magnet array assemblies, like magnet array assembly 116B of FIG. 3B, which have a magnet array that is furthest in the positive stage-x direction and furthest in the positive stage-y direction and which comprises magnetization segments which are elongated in the stage-y direction may be referred to as left-handed magnet array assemblies. It should be understood that many variations to magnet array assemblies 116A, 116B can be used in moveable stages 110A, 110B. In one example, magnet array assembly 116A of FIG. 3A can be changed from a right-handed to a left-handed variation. In another example, magnet array assembly 116B of FIG. 3B can be changed from a left handed to a right handed variation.

Figure 3C:
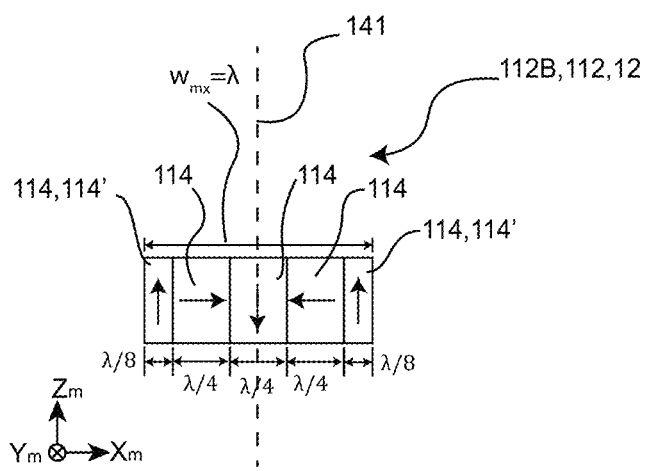
FIG. 3C is a cross-sectional view of an exemplary y-magnet array which is used in the FIG. 3A magnet array assembly and which could be used for the magnet array assemblies of FIG. 3B or any of the other elongated segment magnet array assemblies described herein.

As discussed above, other than for their orientations, the magnet arrays 112 in magnet array assemblies 116A, 116B and moveable stages 110A, 110B may be substantially similar to one another. However, the magnet arrays 112 in magnet array assemblies 116A, 116B may have a wide variety of patterns of magnetization segments 114 (and their corresponding magnetization directions). FIG. 3C is a cross-sectional view of an exemplary y-magnet array 112 (e.g. array 112B) which may be used in the FIG. 3A magnet array assembly 116A and/or in the FIG. 3B magnet array assembly 116B and/or in any of the other elongated segment magnet array assemblies described herein. Various other elongated segment magnet arrays 112 could be used in the FIG. 3A magnet array assembly 116A and/or in the FIG. 3B magnet array assembly 116B and/or in any of the other elongated segment magnet array assemblies described herein. For example, Patent Cooperation Treaty Patent application Nos. PCT/CA2012/050751, PCT/CA2014/050739 and PCT/CA2015/050157 (all of which are hereby incorporated by reference herein) disclose a number of different embodiments of elongated segment magnet arrays, each of which could be used for magnet arrays 112 in any of the elongated magnet array assemblies described herein (e.g. magnet arrays assemblies 116A, 116B).

In the illustrated cross-sectional view of FIG. 3C, magnet array 112 comprises a plurality of magnetization segments 114, each of which has a corresponding magnetization direction (where the magnetization directions of magnetization segments 114 are indicated by arrows). While the magnet array 112 of FIG. 3C is a y-magnet array, it will be appreciated that x-magnet arrays may be provided by merely altering the orientations of the illustrated magnet arrays and that the description of magnet arrays 112 described herein should be understood to apply to y-magnet arrays 112 or x-magnet arrays 112 with adjustment of orientation, as appropriate. As can be seen from FIG. 3C, the stage-x direction width of each magnetic segment 114 is generally equal to one of $$\frac{\lambda_x}{4} \text{ or } \frac{\lambda_x}{8}.$$

In the case of the FIGS. 3A and 3B embodiments, the edge magnetization segments 114' (i.e. magnetization segments 114' at the edges of arrays 112) have stage-x direction widths $$\left(\frac{\lambda_x}{8}\right)$$

that are half of the stage-x direction widths $$\left(\frac{\lambda_x}{4}\right)$$

of the other (interior) magnetization segments 114. In some embodiments, the stage-x direction widths of each magnetic segment 114 may be generally equal to one of $$\frac{\lambda_x}{N} \text{ or } \frac{\lambda_x}{2N},$$

where N is any positive integer. In some embodiments, edge magnetization segments 114' may have stage-x direction widths $$\left(\frac{\lambda_x}{2N}\right)$$

that are half of the stage-x direction widths $$\left(\frac{\lambda_x}{N}\right)$$

of the other (interior) magnetization segments 114. In some embodiments, N=$N_t$ (where $N_t$ represents the number of different magnetization directions in an array 112), as is the case in the illustrated embodiments of FIG. 3C. In the illustrated embodiments of FIG. 3C, the edge magnetization segments 114' have magnetization directions that are oriented in the stage-z direction (in the positive stage-z direction in the case of the illustrated embodiment). For any of the embodiments of magnet arrays 112 shown and/or described herein, the stage-z directions of the magnetization segments 114 may be inverted from those shown and/or described herein.

The various magnet arrays 112 shown in the illustrated embodiments of FIGS. 3A-3C exhibit a number of similar properties. The magnetization directions of magnetization segments 114 are orthogonal to the elongation directions of magnetization segments 114. At least two of magnetization segments 114 of each magnet array 112 are different from one another. In general, magnet arrays 112 may comprise magnetization segments 114 with any suitable integer number $N_t$ ($N_t \geq 2$) of magnetization directions. In the illustrated embodiment of FIG. 3C, $N_t$=4. The magnetization directions of magnetization segments 114 exhibit a spatial period $\lambda_x$ over the stage-x width of magnet arrays 112. To avoid complicating the illustration of FIG. 3C, the spatial period $\lambda_x$ is shown as $\lambda$ without loss of generality. In the FIG. 3C embodiment, the stage-x direction width ($W_{mx}$) of magnet array 112 is generally equal to $\lambda_x$, so that the magnetization directions of magnetization segments 114 exhibit a single spatial period $\lambda_x$ over the stage-x direction width $W_{mx}$ of magnet array 112. In some embodiments, the magnetization directions of first magnetization segments 114 may exhibit any positive integer number $N_m$ spatial periods $\lambda_x$ which repeat over the stage-x direction width (($W_{mx}=N_m\lambda_x$) of magnet array 112. In the illustrated embodiment of FIG. 3C, the magnetization directions of magnetization segments 114 are mirror symmetric relative to a plane of symmetry (extending in the stage-y and stage z-directions and passing through the stage-x direction center of magnet array 112 indicated by lines 141 shown in FIG. 3C).

Moveable stage 10 of displacement device 50 may comprise optional bumpers (not shown) which may protect moveable stage 10 from other moveable stages and other objects that may be introduced onto stator 30 or into working region 36. Bumpers may be made of non-magnetic materials to protect moveable stage 10 and its magnet array assembly 16. Further bumpers may prevent two or more moveable stages 10 from getting too close to one another (e.g. to a vicinity where their respective magnetization segments 14 might attract one another and might undesirably influence the forces caused by current controllably driven into coil traces 32, 34). Bumpers may also serve to prevent other objects with high magnetic permeability from getting too close to magnet array assembly 16. For example, in the absence of non-magnetic bumpers, an iron or steel washer/screw/nuts dropped onto working region 36 can be attached to magnet array assembly 16 and cause system failure. Examples of suitable bumpers which can be used for any of the moveable stages described herein are described in PCT/CA2015/050157.

In some embodiments, moveable stage 10 may comprise a stage support structure which may be fabricated from highly magnetically permeable material (e.g. with relative magnetic permeability greater than 100), such as iron, ferrite, cobalt, combinations of these materials and/or the like. High magnetic permeability helps enhance the magnetic field below (e.g. in the negative stator-z direction relative to) magnet array assembly 16, which is where the coil traces of stator 30 are typically located during operation. In some embodiments, it may be beneficial to use a stage support structure without back iron. Such embodiments may be desirable to minimize the weight of moveable stage 10, for example. Such stage support structures can be fabricated from aluminum, ceramic, carbon-fiber reinforced composite materials, combinations of these materials and/or the like. Reducing the weight of stage support layer may help to minimize moveable stage inertia.

Stator

Various embodiments and additional detail of stator 30 are now provided. Referring back to FIG. 1 described above, stator 30 comprises a stator coil assembly 35 which comprises at least the traces of a plurality of electrically conductive coils 31. Coils 31 are shaped to provide first and second pluralities of coil traces 32, 34 which are respectively elongated in non-parallel directions. In particular embodiments, such as depicted in FIG. 1A, first plurality of coil traces 32 is orthogonal to second plurality of coil traces 34. In particular embodiments, such as depicted in FIG. 1A, first plurality of coil traces 32 is distributed over at least a portion of a first layer 40 and generally elongated in a stator-x direction; and second plurality of coil traces 34 is distributed over at least a portion of a second layer 42 and generally elongated in a stator-y direction. In some embodiments, such as depicted in FIG. 1A, the first and second layers 40, 42 over which first and second pluralities of coil traces 32, 34 are respectively distributed may be located at different (e.g. first and second) stator-z locations and layers 40, 42 may overlap one another in the stator-z direction, although this is not necessary. In some embodiments, first and second layers 40, 42 may be provided in different excitation regions (also referred to herein as stator tiles or tiles and described in more detail below), but at the same stator-z location.

In some embodiments, stator 30 may comprise additional pluralities of coil traces (not shown) which may be distributed over portions of additional layers at corresponding additional stator-z direction locations. For example, stator 30 may comprise a first additional plurality of coil traces (not shown) distributed over at least a portion of a first additional layer at a corresponding first additional stator-z location and generally elongated in a stator-x direction; and a second additional plurality of coil traces (not shown) distributed over at least a portion of a second additional layer at a corresponding second additional stator-z location and generally elongated in a stator-y direction. Additional pluralities of coil traces are not limited to being elongated in the stator-x or stator-y directions. In some embodiments, additional pluralities of coil traces are provided which are generally elongated in angular directions between the stator-x and stator-y directions. For example, in some embodiments, stator 30 may comprise one or both of: a first additional angular plurality of coil traces (not shown) distributed over at least a portion of a first additional angular layer at a corresponding first additional angular stator-z location and generally elongated in a direction split between the positive stator-x and positive stator-y directions (e.g. at 45° counter-clockwise around a stator-z axis from the positive stator-x direction in some embodiments); and a second additional angular plurality of coil traces (not shown) distributed over at least a portion of a second additional angular layer at a corresponding second additional angular stator-z location and generally elongated in a direction split between the negative stator-x and positive stator-y directions (e.g. at 45° clockwise around a stator-z axis from the negative stator-x direction in some embodiments). In other embodiments, additional pluralities of coil traces may be elongated at angles α other than 45° from the stator-x and/or stator-y directions. Such coil traces may be referred to herein as α-oriented coil traces or α-traces, where α is their angle as measured from one of the stator-x or stator-y axes.

In some embodiments, coil traces 32, 34 in layers 40, 42 at different stator-z locations may overlap one another in the stator-z direction. The two dimensional space over which coil traces 32, 34 overlap one another in the stator-z direction may define a working region 36 over which moveable stage 10 is moveable relative to stator 30. In some embodiments, coil traces 32, 34 in each corresponding layer 40, 42 may be distributed throughout their respective layers 40, 42, so that coil traces 32, 34 and/or layers 40, 42 may overlap in the stator-z direction at all locations in working region 36. This is not necessary. In some embodiments, coil traces 32, 34 may occupy particular excitation regions (also referred to as stator tiles and described in more detail below) that occupy less than an entirety of a corresponding layer 40, 42. Some of coil traces 32, 34 may be connected at their ends to form a two-phase, three-phase, or multiple-phase winding configuration as described in more detail below. While working region 36 is a two-dimensional space, this description may describe working region 36 as a feature of stator 30, for convenience.

Figure 4:
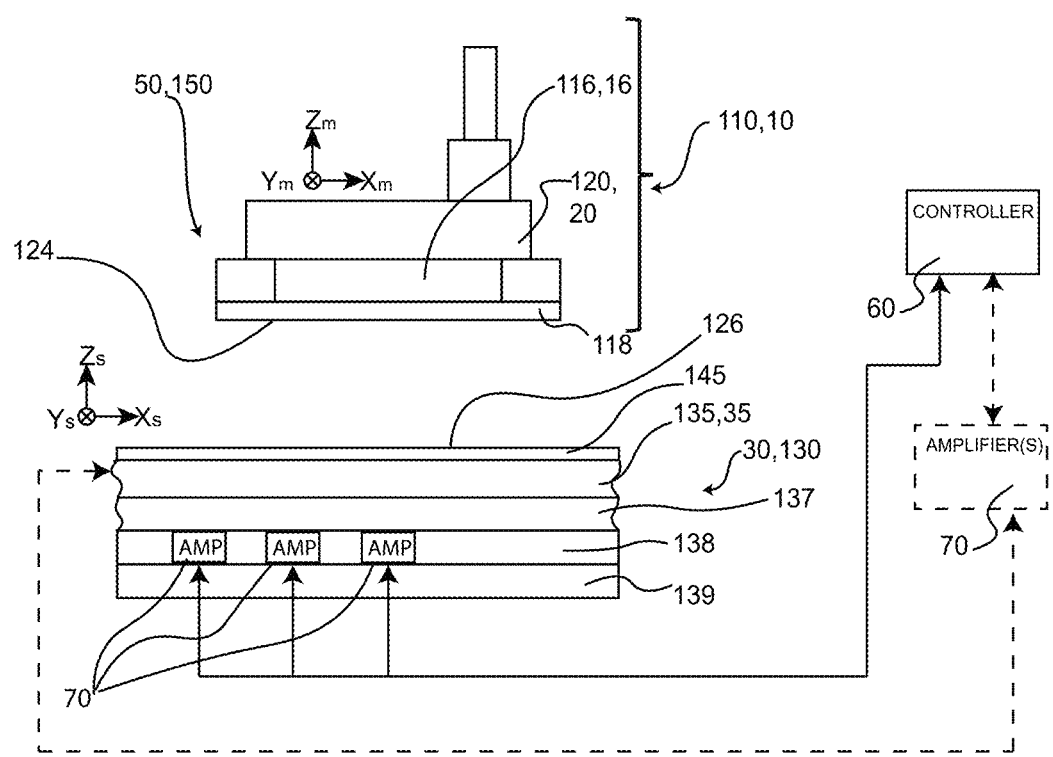
FIG. 4 is a partial schematic side cross-sectional view of a displacement device according to a particular embodiment of the invention.

FIG. 4 shows a displacement device 150 according to a particular embodiment of the invention. FIG. 4 comprises a moveable stage 110 similar to one of those shown in FIGS. 3A-3C and a stator 130. Stator 130 of the FIG. 4 embodiment comprises an optional stator bearing layer 145, stator coil assembly 135, coil supporting layer 137, power electronics layer 138, and optional cooling layer 139. Stator coil assembly 135 may comprise the aforementioned coils 31 and/or coil traces 32, 34.

Optional stator bearing layer 145 may overlap with stator coil assembly 135 in stator-z direction over the stator-x/stator-y span of working region 36 (not shown in FIG. 4). Stator bearing layer 145 may comprise a generally planar stator bearing surface 126 which may bear against (or be separated by an air gap from) stage bearing surface 124 of stage bearing layer 118 of moveable stage 110. In the illustrated embodiment, stage bearing surface 124 faces the negative stator-z direction and stator bearing surface 126 faces the positive stator-z direction. Various stator bearing layers and restrictor layers are described in Patent Cooperation Treaty application No. PCT/CA2015/050157 and may be used with any of the embodiments of stator 30 (or 130, 230 etc.) as described herein.

Coil supporting layer 137 may provide mechanical support to stator coil assembly 135. Stator coil assembly 135 of the FIG. 3 embodiment may be substantially similar to stator coil assembly 35 of the FIG. 1 embodiment and may comprise coils 31 shaped to provide coil traces 32, 34 (and any additional coil traces) having features similar to those of the FIG. 1 embodiment. Controller 60 may be connected to deliver control signals to one or more amplifiers 70 and controller 60 may be configured to use those control signals to control the currents driven by amplifier(s) 70 into at least some of coil traces 32, 34 to thereby cause moveable stage 10, 110 to track a desired position within working region 36—e.g. a desired position, $(x_r, y_r)$, within working region 36, where $x_r$ is a desired position of moveable stage 10, 110 in the stator-x direction and $y_r$ is a desired position of moveable stage 10, 110 in the stator-y direction.

In some embodiments, when in operation, moveable stage bearing surface 124 is in close proximity with (e.g. adjacent to) and generally parallel to stator bearing surface 126. In some embodiments, the stator-z direction gap between moveable stage 110 and stator 130 is less than 10 mm, and is typically around 1 mm. This space between stator 130 and moveable stage 110 can be maintained (at least in part) by Z-direction forces created by the interaction of the magnetic fields generated by current in coil traces 32, 34 of stator 130 with magnet arrays 112 of moveable stage 110 as discussed below. In some embodiments, this space (or air gap) between stator 130 and moveable stage 110 can be maintained using additional lifting and/or hoisting magnets, aerostatic bearings, roller bearings and/or the like (not shown), as is known in the art. In some embodiments, as discussed above, the magnetic forces generated by the interaction of currents driven into coil traces 32, 34 and magnet array(s) 112 of moveable stage 110 may be controlled (e.g. by controller 60), such that moveable stage 110 is attracted toward stator 130 whenever the currents are being controllably driven into coil traces 32, 34.

Figure 5:
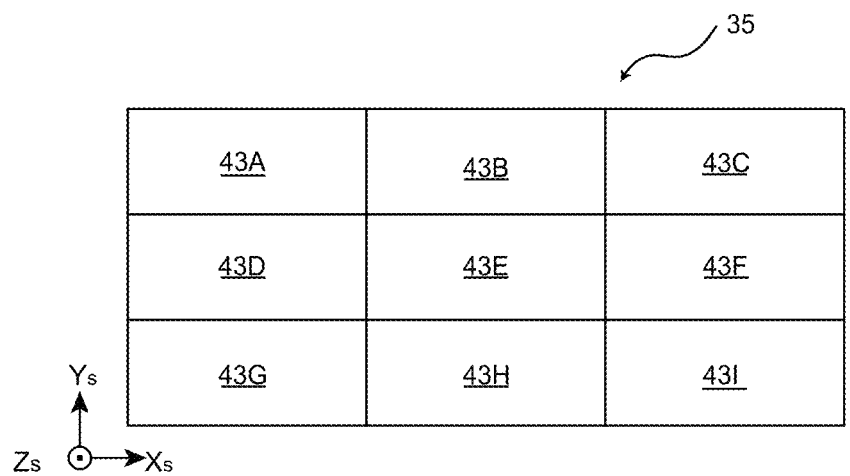
FIG. 5 shows a schematic top view of a stator coil assembly according to a particular embodiment which may be used in any of the displacement devices described herein.

FIG. 5 shows a schematic top view of a stator coil assembly 35 according to a particular embodiment which may be used in displacement device 50 (FIG. 1), displacement device 150 (FIG. 4) or any of the other displacement devices described herein. Stator coil assembly 35, as depicted, comprises a plurality of excitation regions 43A-43I (collectively, excitation regions 43). Excitation regions 43 may also be referred to herein as stator tiles 43 or, for brevity, tiles 43. In some embodiments, each of excitation regions 43 is rectangular in shape. In some embodiments, excitation regions 43 may have other shapes (e.g. triangular, hexagonal and/or the like). Each location in each of excitation regions 43 may overlap corresponding coil trace layers 40, 42 at different stator-z locations and corresponding coil traces 32, 34 (and any additional layers and additional coil traces) in the stator-z direction. Coil traces 32, 34 that overlap a particular one of excitation regions 43 in the stator-z direction may be said to be coil traces 32, 34 in, of, associated with or corresponding to the particular one of excitation regions 43. Each coil trace 32, 34 in each excitation region 43 can be excited with a controllable current, where such current may be controlled by controller 60 which may use control signals to control amplifier(s) 70 which in turn drive current into coil traces 32, 34. Each of excitation regions 43 may be connected to a corresponding amplifier module, which may be located in power electronics layer 138 (see FIG. 4) or may be spatially separated from stator 30 and connected to coil traces 32, 34 in its excitation region 43 using suitable electrical connections. Currents driven into the coil traces 32, 34 in each excitation region 43 can be independently controlled. In some embodiments, two or more excitation regions 43 may share a common amplifier 70 by connecting their corresponding coil traces in parallel or serially. It is not necessary that a particular stator coil assembly 35 comprise a plurality of excitation regions. In some embodiments, it is sufficient for a stator coil assembly 35 to have a single excitation region that spans the entire working region.

Figure 6A:
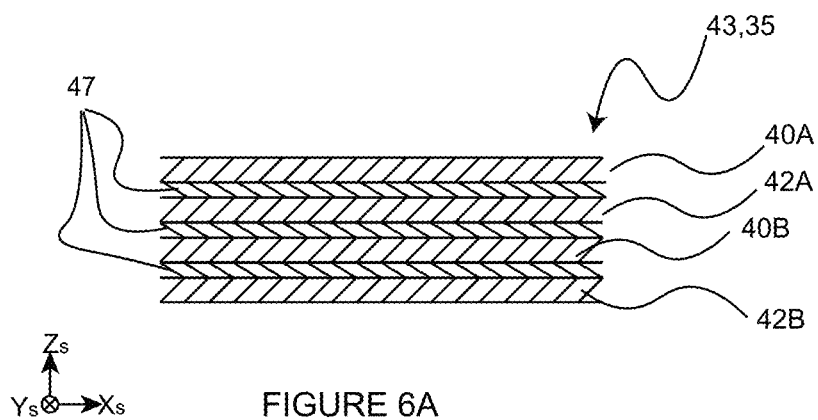
FIGS. 6A-6C each show schematic depictions of portions of coil trace layers and/or coil traces in a corresponding excitation region.
Figure 6B:
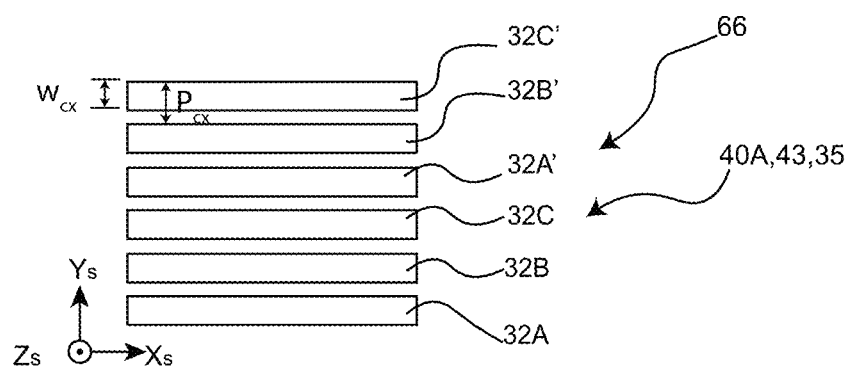
Figure 6C:
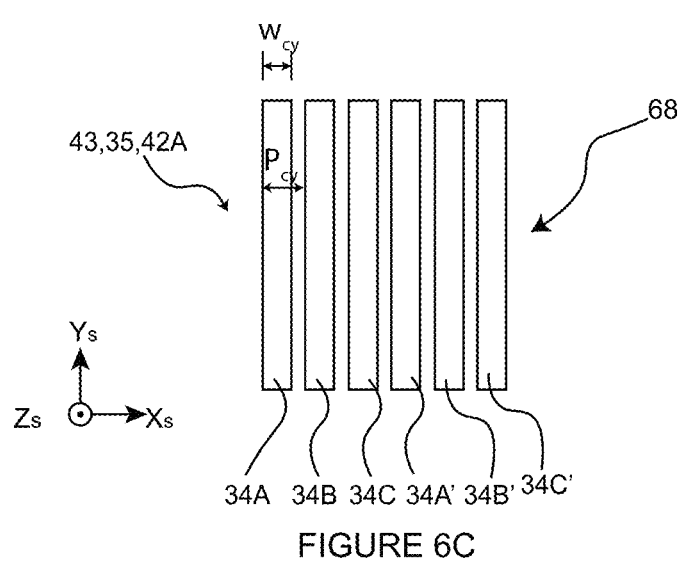

FIGS. 6A-6C each show schematic depictions of portions of coil trace layers 40, 42 and/or coil traces 32, 34 in a corresponding excitation region 43. FIG. 6A is a cross-sectional view (along a stator-x/stator-z plane) of one excitation region 43 of stator coil assembly 35 comprising a plurality of coil trace layers 40A, 40B, 42A, 42B (collectively, coil trace layers, 40, 42). In the FIG. 6A embodiment, each coil trace layer 40, 42 extends in the stator-x and stator-y directions across corresponding excitation region 43, although this is not necessary. In the FIG. 6A embodiment, stator 30 comprises a plurality of x-trace layers 40A, 40B located at different stator-z locations and a plurality of y-trace layers 42A, 42B located at different stator-z locations in one excitation region 43 (although this is not necessary). In the FIG. 6A embodiment, each coil trace layer 40, 42 is separated from adjacent coil trace layers 42, 40 by an insulation layer 47. Insulation layer 47 prevents electrical conduction between coil trace layers 40, 42. Each coil trace layer 40, 42 extends generally in the stator-x and stator-y directions with its normal direction generally parallel to the stator-z direction. As discussed above, each coil trace layer 40, 42 comprises a plurality of coil traces which may be distributed over at least a portion of the layer and which extend in a particular stator direction (e.g. in the stator-x direction or the stator-y direction).

FIG. 6B is a schematic cross-sectional view (along a stator-x/stator-y plane) of a portion of a first coil trace layer 40A according to a particular embodiment. Coil trace layer 40B may have characteristics similar to coil trace layer 40A. The portion of coil trace layer 40A shown in the FIG. 6B embodiment comprises a plurality (referred to herein as a group) 66 of coil traces 32A, 32B, 32C, 32A', 32B', 32C' (collectively, coil traces 32), with each coil trace 32 linearly elongated in the stator-x direction. Due to their elongation in the stator-x direction, coil traces 32 may be referred to herein as x-traces 32 and group 66 and coil trace layer 40A may be respective referred to as an x-trace group 66 and an x-trace layer 40 or an x-group 66 and an x-layer 40. The x-traces 32 may extend in the stator-x direction across x-trace layer 40 and/or across a corresponding excitation region 43. The x-trace layer 40 in one excitation region 43 may comprise one or more x-trace groups 66, which may be distributed across x-trace layer 40 and/or a corresponding excitation region 43 in the stator-y direction. As explained in more detail below, in some embodiments, each x-trace group 66 may comprise a plurality of x-coil traces 32 which may be driven (by one or more connected amplifiers 70) with corresponding multi-phase currents so that one phase of the multi-phase currents is driven into each x-coil trace 32 in the x-trace group 66. In some embodiments, the multi-phase currents have a number n of effective phases and the number of x-traces 32 in each x-trace group 66 is 2n, where each x-trace 32 is connected to receive a phase of the multiphase current in one direction or in the opposing direction. FIG. 6C is a schematic cross-sectional view (along a stator-x/stator-y plane) of a second coil trace layer 42A according to a particular embodiment. Coil trace layer 42B may have characteristics similar to coil trace layer 42A. Coil trace layer 42A of the FIG. 6C embodiment comprises a plurality (referred to herein as a group) 68 of coil traces 34A, 34B, 34C, 34A', 34B', 34C' (collectively, coil traces 34), with each coil trace 34 linearly elongated in the stator-y direction. Due to their elongation in the stator-y direction, coil traces 34 may be referred to herein as y-traces 34 and group 68 and coil trace layer 42A may be respective referred to as a y-trace group 68 and a y-trace layer 42 or a y-group 68 and a y-layer 42. The y-traces 34 may extend in the stator-y direction across y-trace layer 42 and/or a corresponding excitation region 43. The y-trace layer 42 in one excitation region 43 may comprise one or more y-trace groups 68, which may be distributed across y-trace layer 42 and/or a corresponding excitation region 43 in the stator-x direction. As explained in more detail below, in some embodiments, each y-trace group 68 may comprise a plurality of y-coil traces 34 which may be driven (by one or more connected amplifiers 70) with corresponding multi-phase currents so that one phase of the multi-phase currents is driven into each y-coil trace 34 in the y-trace group 68. In some embodiments, the multi-phase currents have a number n of effective phases and the number of y-traces 34 in each y-trace group 68 is 2n, where each y-trace 34 is connected to receive a phase of the multiphase current in one direction or in the opposing direction.

It will be appreciated that the number of coil traces 32, 34 in groups 66 need not be limited to the exemplary six traces shown in FIGS. 6B, 6C although this number of traces in a group is convenient for using three-phase current as explained in more detail below. In some embodiments, coil trace layers 40, 42 adjacent to one another in the stator-z direction may comprise coil traces that are non-parallel with respect to one another. In some embodiments, coil trace layers 40, 42 adjacent to one another in the stator-z direction may comprise coil traces that are orthogonally oriented with respect to one another. It will be appreciated that the number of coil trace layers 40, 42 in stator 30 need not be limited to the four traces shown in the illustrative embodiment of FIG. 6A. In general, stator 30 may comprise any suitable number of coil trace layers 40, 42. Further, it is not a requirement that the orientations of coil traces in coil trace layers 40, 42 adjacent to one another in the stator-z direction be different from one another. In some embodiment, coil traces may be provided which extend in directions other than the stator-x or stator-y directions. Such traces which may be referred to as α-traces are described in PCT/CA2015/050157.

Further details of stator, coil traces, excitation regions and coil trace layers are described in Patent Cooperation Treaty Patent application Nos. PCT/CA2012/050751, PCT/CA2014/050739 and PCT/CA2015/050157.

Control and Operation

In some embodiments, x-traces 32 in different x-trace layers 40, in different x-trace groups 66 and/or individual x-traces 32 may each be independently driven (by amplifiers 70 under the control of controller 60) with different power amplifier channels. Similarly, in some embodiments, y-traces 34 in different y-trace layers 42, in different y-trace groups 68 and/or individual y-traces 34 may each be independently driven (by amplifiers 70 under the control of controller 60) with different power amplifier channels. While such independent connection provides maximum flexibility of control, this configuration is not necessary in all embodiments or applications. In some embodiments, x-traces 32 in different x-trace layers 40 or in different x-trace groups 66 of one excitation region 43 may be connected serially or in parallel and y-traces 34 in different y-trace layers 42 or in different y-trace groups 68 of one excitation region 43 may be connected serially or in parallel.

Figure 7:
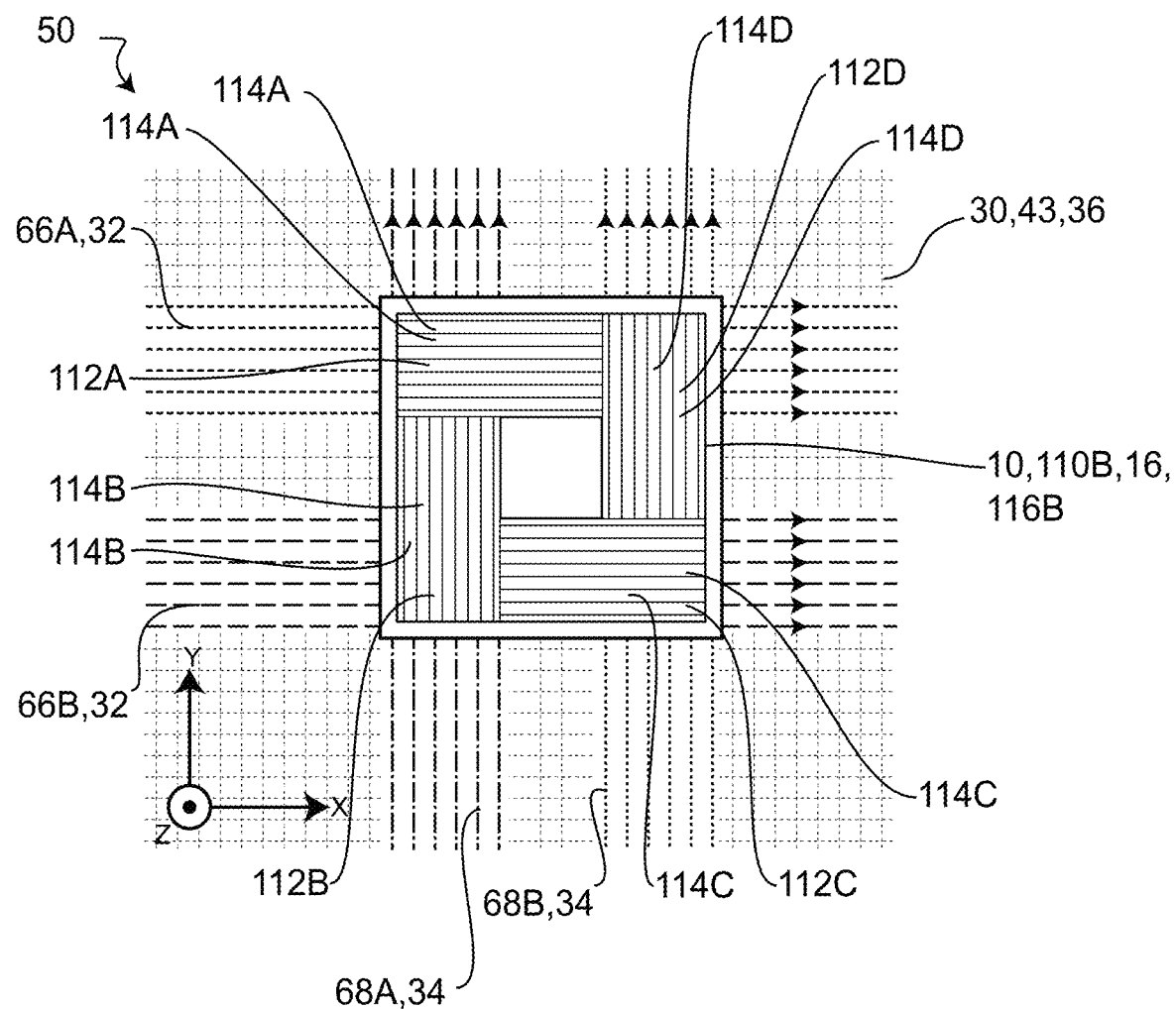
FIG. 7 is a schematic top view of the FIG. 1 displacement device incorporating a moveable stage having the FIG. 3B magnet array assembly according to a particular embodiment.

In general, current driven through the coil traces 32, 34 is used to propel moveable stage 10 to a desired position relative to stator 30 (e.g. in working region 36) and/or to a desired orientation relative to stator 30. Current driven in x-traces 32 may be used to impart force onto (and thereby propel) moveable stage 10 along a stator-y direction to track a desired stator-y position $y_r$; current driven in y-coil traces 34 may be used to impart force onto (and thereby propel) moveable stage 10 along a stator-x direction to track a desired stator-x position $x_r$. Either or both of current driven in x-traces 32 and y-traces 34 may be used to pivot moveable stage 10 around a stator-z oriented axis. Either or both of current driven in x-traces 32 and y-traces 34 may be used to impart force onto (and thereby propel) moveable stage 10 in a stator-z direction. Current driven in x-traces 32 may be used to pivot moveable stage 10 around a stator-x orientied axis; current driven in y-traces 34 may be used to pivot moveable stage 10 around a stator-y oriented axis. The schematic illustration of displacement device 50 shown in FIG. 7 is useful for explaining the particulars of the operation of displacement device 50. The FIG. 7 displacement device 50 comprises a moveable stage 10 and a magnet array assembly 16 which are similar to moveable stage 110 and magnet array assembly 116B shown in FIG. 3B, although the principles of operation are similar for other moveable stages and other magnet array assemblies 16 described herein. A portion of stator 30 (e.g. an excitation region 43 or a portion of an excitation region 43) is shown schematically in FIG. 7 by an intersecting array of lines which represent x-traces 32 and y-traces 34. To facilitate explanation, it is assumed that each x-trace 32 and each y-trace 34 is independently controllable—i.e. that the current driven into such traces 32, 34 is independently controllable. X-traces 32 include two x-trace groups 66A, 66B which are shown with bold lines to indicate that they are active (i.e. that current is being driven into the x-traces 32 of x-trace groups 66A, 66B) and y-traces 34 include two y-trace groups 68A, 68B which are shown with bold lines to indicate that they are active (i.e. that current is being driven into the y-traces 34 of y-trace groups 68A, 68B). The magnetic fields associated with the currents being driven in x-trace groups 66A, 66B interact primarily with x-magnet arrays 112A, 112C respectively; and the magnetic fields associated with the currents being driven in y-trace groups 68A, 68B interact primarily with y-magnet arrays 112B, 112D respectively. More particularly: when x-traces 32 in x-trace group 66A are carrying current, they interact with x-magnet array 112A to impart forces on moveable stage 10 in the y and z directions; when y-traces 34 in y-trace group 68A are carrying current, they interact with y-magnet array 112B to impart forces on moveable stage 10 in the x and z directions; when x-traces 32 in x-trace group 66B are carrying current, they interact with x-magnet array 112C to impart forces on moveable stage 10 in the y and z directions; and when y-traces 34 in y-trace group 68B are carrying current, they interact with y-magnet array 112D to impart forces on moveable stage 10 in the x and Z directions.

It will be appreciated that coil traces 32, 34 shown in FIG. 7 can be selectively activated (e.g. by driving current through the coil traces 32, 34) to impart desired forces on moveable stage 10 and to thereby control the motion (e.g. position) of moveable stage 10 with six degrees of freedom relating to the rigid body motion of moveable stage 10. In some embodiment, each x-trace group 66 and each y-trace group 68 can be selectively activated (e.g. by driving current through the traces corresponding to the coil trace group 66, 68) or deactivated. When a coil trace group 66, 68 is selectively activated, the coil traces corresponding to the coil trace group 66, 68 may be driven with multi-phase currents by one or more multi-phase amplifiers 70. In general, such multi-phase currents can comprise two-phases, three-phases, or any suitable number of phases. When moveable stage 10 is shown in the particular position shown in FIG. 7, coil traces 32, 34 other than those in groups 66A, 66B, 68A, 68B may be inactive. However, it will be appreciated that as moveable stage 10 moves relative to stator 30, different groups of coil traces 32, 34 may be selected to be active and to impart desired forces on moveable stage 10.

It may be observed that the active coil traces 32, 34 in groups 66A, 66B, 68A, 68B appear to interact with other magnet arrays. For example, when carrying current, x-traces 32 in x-trace group 66B interact with x-magnet array 112C as discussed above, but x-traces 32 in x-trace group 66B also pass under a portion of y-magnet array 112B. One might expect that, the currents in x-trace group 66B might interact with the magnets in y-magnet array 112B and impart additional forces on moveable stage 10. However, because of the aforementioned characteristics of y-magnet array 112B, the forces that might have been caused by the interaction of currents in x-trace group 66B and the magnetization segments 114B of y-magnet array 112B cancel one another out, such that these parasitic coupling forces may be eliminated or kept to a minimal level. More particularly, the characteristics of y-magnet array 112B that eliminate or reduce these cross-coupling forces include: y-magnet array 112B comprises magnetization segments 114B which are generally elongated in the stage-y direction with varying magnetizations which are oriented orthogonally to the stage-y direction; the x-dimension width $W_{mx}$ of y-magnet array 112B is $W_{mx}=N_m\lambda_x$ where $N_m$ is an integer and $\lambda_x$ is the magnetic period $\lambda_x$ described above; and y-magnet array 112B is mirror symmetric about a y-z plane 141 that runs through the center of the stage-x dimension of y-magnet array 112B. Similar characteristics of y-magnet array 112D may eliminate or minimize cross-coupling from x-traces 32 in x-trace group 66A. In an analogous manner, the characteristics of x-magnet array 112A may eliminate or reduce cross-coupling forces from y-traces 34 in y-trace group 68A. Such characteristics of x-magnet array 112A include: x-magnet array 112A includes magnetization segments 114A which are generally elongated in the stage-x direction with varying magnetizations which are oriented orthogonally to the stage-x direction; the y-dimension width $W_{my}$ of x-magnet array 112A is $W_{my}=N_m\lambda_y$ where $N_m$ is an integer and $\lambda_y$ is the magnetic period $\lambda_y$ described above; and x-magnet array 112A is mirror symmetric about a x-z plane that is orthogonal to the y-axis and runs through the center of the y-dimension of x-magnet array 112A. Similar characteristics of x-magnet array 112C may eliminate or minimize cross coupling from y-traces 34 in y-trace group 68B.

Further details relating to how currents driven into coil traces 32, 34 impart forces onto moveable stage 10 are described in PCT/CA2012/050751.

Displacement device 50 comprises one or more amplifiers 70 which are connected (e.g. with suitable electrical connections (not expressly shown in FIG. 1)) to drive a plurality of currents into coil traces 32, 34. Amplifiers 70 are controlled by controller 60 which is connected and configured to provide control currents to amplifiers 70. Controller 60 (and components thereof) may comprise hardware, software, firmware or any combination thereof. For example, controller 60 may be implemented on a programmed computer system comprising one or more processors, user input apparatus, displays and/or the like. Controller 60 may be implemented as an embedded system with a suitable user interface comprising one or more processors, user input apparatus, displays and/or the like. Processors may comprise microprocessors, digital signal processors, graphics processors, field programmable gate arrays, and/or the like. Components of controller 60 may be combined or subdivided, and components of controller 60 may comprise sub-components shared with other components of controller 60. Components of controller 60, may be physically remote from one another. Controller 60 may be connected (e.g. with suitable electrical connections (not expressly shown in FIG. 1)) to deliver control signals to amplifiers 70. Controller 60 may be configured (e.g. using suitable software, logic configuration and/or the like) to use those control signals to control the currents driven by amplifiers 70 into at least some of coil traces 32, 34 to thereby cause moveable stage 10 to track a desired position within relative to stator 30 in working region 36—e.g. a desired position, $(x_r, y_r)$, within working region 36, where $x_r$ is a desired position of moveable stage 10 in the stator-x direction and $y_r$ is a desired position of moveable stage 10 in the stator-y direction.

Figure 8A:
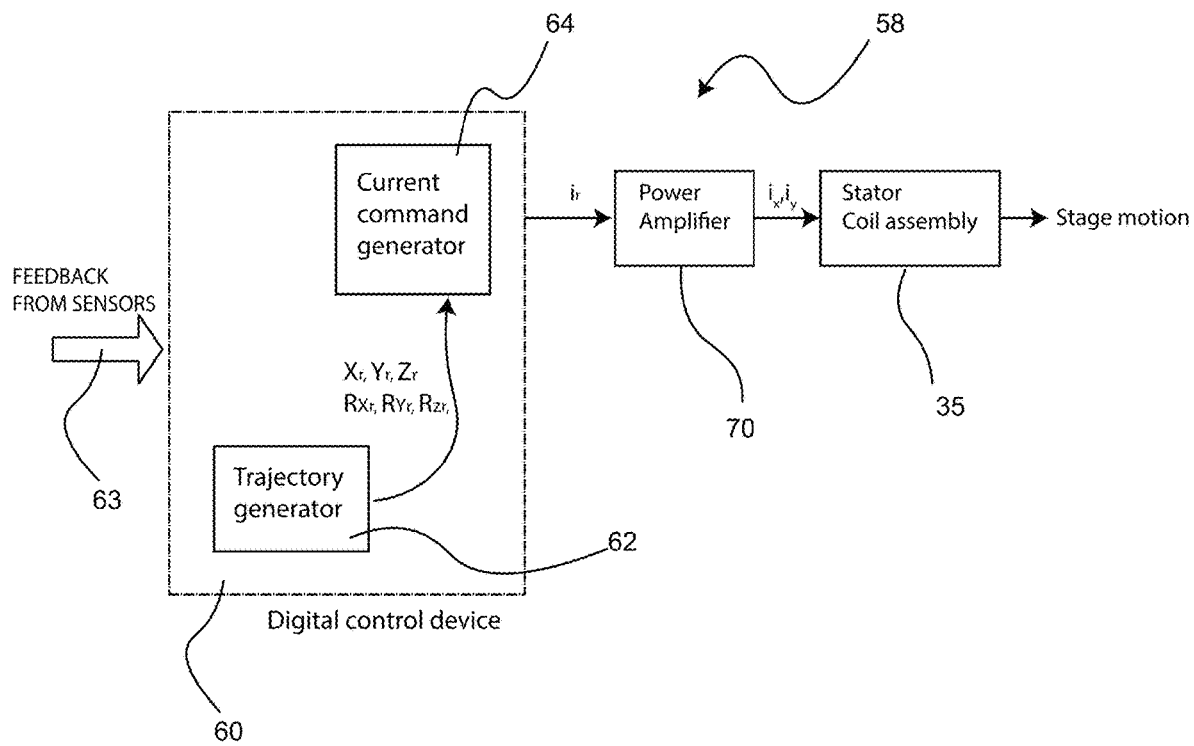
FIGS. 8A and 8B are respectively a schematic block diagram of a control system suitable for use in controlling any of the displacement devices described herein according to a particular embodiment and one possible connection scheme to connect a group of y-traces in one coil trace layer within an excitation region according to a particular embodiment.

FIG. 8A shows a schematic block diagram of a control system 58 suitable for use in controlling any of the displacement devices 50 described herein according to a particular embodiment. Although they may be described as different embodiments, except where otherwise specifically noted, control system 58 and any of the control techniques, embodiments and methods described in the remainder of this description may be used with any of the displacement devices 50 described herein. Control system 58 of the FIG. 8A embodiment comprises controller 60, one or more amplifiers 70 and stator coil assembly 35. Controller 60 may be configured to control (e.g. by providing control signals to) one or more amplifiers 70 (illustrated, in FIG. 8A, as power amplifier 70) to drive currents into the plurality of coil traces in coil trace assembly 35. Such currents can be used by controller 60 to controllably move moveable stage 10 relative to stator 30 via forces associated with the interaction between the magnetic fields generated by currents in the plurality of coil traces and the magnetic fields of the magnet array assembly 16 on moveable stage 10. The currents may be controlled by controller 60 such that these magnetic forces on moveable stage 10 may attract moveable stage 10 toward stator 30 (e.g. in the negative stator-z direction) or may force stage 10 away from stator 30 (e.g. in the positive stator-z direction) at all times when controller 60 is controlling the currents driven by the one or more amplifiers 70.

In the illustrated embodiment, controller 60 is shown as comprising a trajectory generator 62 which generates desired or reference positions for each moveable stage 10. Such reference positions may include any one or more of: a desired or reference stator-x position $x_r$ of moveable stage 10, a desired or reference stator-y position $y_r$ of moveable stage 10, a desired or reference stator-z position $z_r$ of moveable stage, a desired rotational orientations $rz_r$ of moveable stage 10 about a stage-z oriented axis (e.g. a stage-z oriented axis through the stage-x/stage-y center of moveables stage 10 or magnet array assembly 16), a desired rotational orientations $rx_r$ of moveable stage 10 about a stage-x oriented axis (e.g. a stage-x oriented axis through the stage-y/stage-z center of moveables stage 10 or magnet array assembly 16) and a desired rotational orientations $ry_r$ of moveable stage 10 about a stage-y oriented axis (e.g. a stage-y oriented axis through the stage-x/stage-z center of moveables stage 10 or magnet array assembly 16). The reference positions ($x_r$, $y_r$, $z_r$, $rx_r$, $ry_r$, $rz_r$) (or any subset thereof) generated by trajectory genereator 62 are typically based on user requirements, application requirements and/or feedback 63 relating to moveable stage(s) 10. By way of non-limiting example, feedback 63 may comprise measured characteristics, such as position, velocity, accelleration and/or orientation of moveable stage(s) 10 which may be obtained from suitable sensors. Feedback 63 can originate from any suitable measurement device(s), system(s) and/or method(s). Some non-limiting examples of suitable measurement device(s), system(s) and/or method(s) are described in Patent Cooperation Treaty application Nos. PCT/CA2012/050751 and PCT/CA2014/050739. For brevity, the remainder of this description will refer to controllably moving moveable stage(s) 10 to reference positions ($x_r$, $y_r$) without loss of generality that similar principles could be used to control the motion (e.g. position) of movable stage (10) with the six degrees of freedom corresponding to ($x_r$, $y_r$, $z_r$, $rx_r$, $ry_r$, $rz_r$). In the illustrated embodiment, controller 60 also comprises a current command generator 64. Typically, although not necessarily, the desired position ($x_r$, $y_r$) of a moveable stage 10 will vary over time, such that each of the reference positions $x_r$, $y_r$ is a function of time and may be described herein as $x_r(t)$, $y_r(t)$ at a particular time, t. The evolutions of the desired positions ($x_r$, $y_r$) over time may be referred to as a desired or reference trajectory. Generally, each moveable stage 10 has a unique reference trajectory. For brevity, except where otherwise dictated by the context or the description, this description will focus on the trajectory and corresponding control of one moveable stage 10, it being understood that trajectories and control of other moveable stages 10 may be similarly implemented. Current command generator 64 receives the desired position ($x_r$, $y_r$) from trajectory generator 62 and feedback 63 and, based on this information, creates corresponding current control signals $i_r$ using a suitable motion control technique and a sutiable current commutation technique. Some examples of suitable motion control and current commutation techniques are described Patent Cooperation Treaty application No. PCT/CA2012/050751. Current command generator 64 provides current control signals $i_r$ to amplifier(s) 70. It will be appreciated that current control signals $i_r$ may comprise a plurality of control signals. In response to these current control signals $i_r$, amplifier(s) 70 drive currents $i_x$, $i_y$ into at least some of the coil traces 32, 34 of stator coil assembly 35. In some embodiments, first currents $i_x$ may represent the currents driven into a first plurality of coil traces (e.g. stator-x oriented coil traces 32) and second currents $i_y$ may represent the currents driven into a second plurality of coil traces (e.g. stator-y oriented coil traces 34). Accordingly, the currents $i_x$ may be referred to herein as x-currents and the currents $i_y$ may be referred to herein as y-currents. As discussed above, stator coil assembly 35 may also comprise α-oriented coil traces and amplifier(s) 70 may additionally or alternatively drive currents $i_\alpha$ into these traces. However, except where otherwise dictated by the context, discussion of drive currents $i_\alpha$ is omitted for brevity from the description of motion control.

Figure 8B:
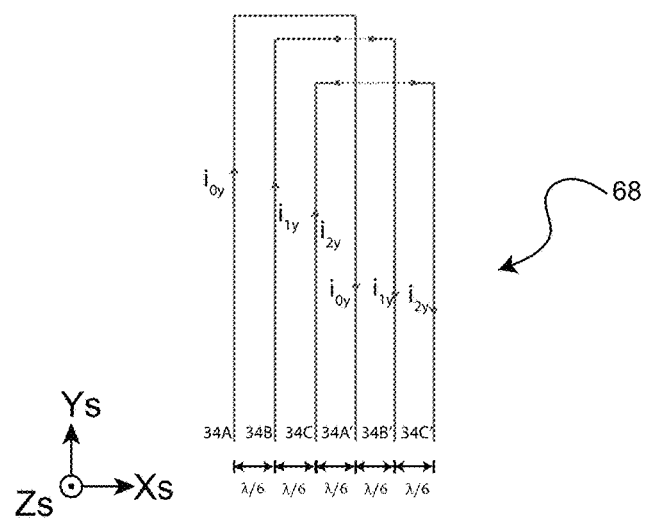

FIG. 8B schematically depicts one possible connection scheme to connect a plurality (e.g. a y-trace group 68) of y-traces 34 in one coil trace layer 42 within an excitation region 43 of stator 30 according to a particular embodiment. It will be appreciated that a plurality (e.g. an x-trace group 66) of x-traces 32 in layer 40 within excitation region 43 of stator 30 may have characteristics analogous to those of y-trace group 66 shown in FIG. 8B. While y-traces 34 shown in FIG. 8B are generally elongated in the stator-y direction, there may be some terminal connections near the edges of one excitation region 43 which connect different y-traces 34 together. Trace terminating connections sometimes extend through one or more other layer(s) (e.g. another layer in the stator-z direction). The illustrated embodiment of FIG. 8B depicts a three-phase effective current embodiment where the y-currents $i_y$ corresponding to the y-traces 34 of y-trace group 68 comprise three different current phases $i_{jy}$ (j=0,1, 2), each of which flows along a first y-trace 34A, 34B, 34C in a first direction and returns along a second y-trace 34A', 34B', 34C' in an opposite, direction (e.g. current $i_{0y}$ flows in one direction along y-trace 34A and flows in the opposite direction along y-trace 34A'). This current configuration may be achieved by appropriate connection of amplifiers 70 to y-traces 34A, 34B, 34C, 34A', 34B', 34C' in a star configuration.

In the FIG. 8B embodiment, the currents $i_y$ corresponding to the y-traces 34 of y-trace group 68 may be described as comprising three effective current phases, because these currents $i_y$ include three current phases $i_{jy}$ flowing in the first direction and returning in the opposing direction at phases that are 180° out of electrical phase with one another. For example, in FIG. 8B embodiment, the current in trace 34A has the same amplitude as the current in trace 34A', but is flowing in an opposite direction; therefore, the currents in traces 34A, 34A' are not independent and are considered to be one effective current phase. In some embodiments, the currents $i_y$ corresponding to the y-traces 34 of a y-trace goup 68 may comprie multi-phase currents comprising a plurality $m_p$ of current phases $i_{jy}$(j=0, 1, . . . , $m_p$−1), where $m_p$ is an integer greater than one. Similarly, the currents $i_x$ corresponding to the x-traces 32 of an x-trace group 66 may comprise multi-phase currents comprising a plurality $n_p$ of current phases $i_{kx}$ (k=0, 1, . . . , $n_p$−1), where $n_p$ is an integer greater than one. The currents $i_x$ may be referred to as first currents $i_x$ or x-currents $i_x$ and their corresponding current phases $i_{kx}$ may be referred to as first current phases $i_{kx}$ or x-current phases $i_{kx}$. The currents $i_y$ may be referred to as second currents $i_y$ or y-currents $i_y$ and their corresponding current phases $i_{jy}$ may be referred to as second current phases $i_{jy}$ or y-current phases $i_{jy}$. In some embodiments, the first currents $i_x$ comprise a plurality of first current phases, $i_{kx}$, where k is an integer from 0 to $n_p$−1 representing a first phase index. Such embodiments may be described has having $n_p$ effective first current phases $i_{kx}$. Similarly, in some embodiments, the second currents $i_y$ comprise a plurality of second current phases, $i_{jy}$, where j is an integer from 0 to $m_p$−1 representing a second phase index, where $m_p$ is the effective number of second current phases.

To control the position of moveable stage 10 relative to stator 30 in displacement device 50, it may be desirable to obtain feedback 63 which may comprise, for example, measured characteristics, such as position, velocity, acceleration and/or orientation of moveable stage(s) 10 relative to stator 30 or to some other reference. Feedback 63 may be obtained from suitable sensors, measurement systems measurement methods and/or the like. Any suitable sensors, measurement systems measurement methods and/or the like may be used to determine feedback 63. Non-limiting examples of suitable sensors which may be used to provide some or all of feedback 63 include: laser displacement interferometers, two-dimensional optical encoders, laser triangulation sensors, capacitive displacement sensors, eddy current displacement sensors, reflective surfaces suitable for interferometry, accelerometers, Hall-effect sensors and/or the like. Different position sensing techniques can be combined to provide an overall system. Various suitable feedback sensor systems and methods are described in Patent Cooperation Treaty application Nos. PCT/CA2012/050751 and PCT/CA2014/050739.

Figure 9:
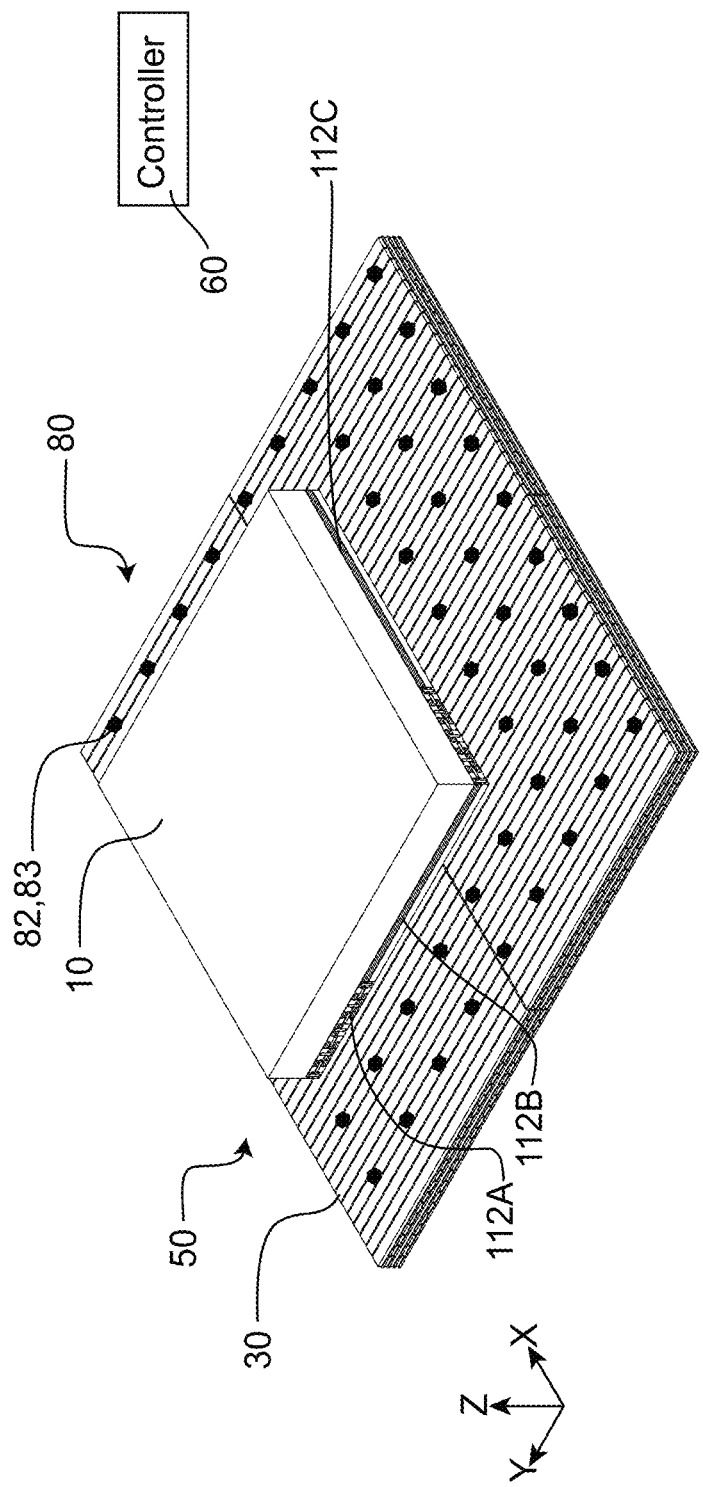
FIG. 9 is a partial schematic isometric view of a displacement device comprising a feedback sensing system according to a particular embodiment of the invention.

FIG. 9 depicts and embodiment of displacement device 50 comprising a feedback sensing system 80 comprising a plurality of magnetic field sensors 82 distributed in an array 83 in a plane extending in the stator-x direction and the stator-y direction with a normal direction in the stator z-direction. Sensors 80 may generate feedback 63 (see FIG. 8A) which may be used by controller 60 to determine or estimate measured characteristics of moveable stage 50. By way of non-limiting example, controller 60 may determine the position, velocity, acceleration and/or orientation of moveable stage 50 relative to stator 30, relative to some reference on or associated with stator 30 and/or relative to some other reference (e.g. some other static reference). In some embodiments, array 83 of sensors 82 is arranged in stator-x oriented sensor rows and stator-y oriented sensor columns, where sensors 82 in a stator-x oriented sensor row are generally aligned with one another in the stator-x direction and sensors 82 in a stator-y oriented sensor column are generally aligned with one another in the stator-y direction. Magnetic field sensors may comprise hall-effect sensors, magneto-resistive sensing elements, magneto-strictive sensing elements and/or any suitable sensor element that is sensitive to magnetic field flux density. Suitable sensing systems 82 incorporating sensor arrays 83 which may be used to generate feedback 63 are described in detail in Patent Cooperation Treaty application No. PCT/CA2014/050739 and may be used with any of the displacement devices described herein.

Multiple Moveable Stages on Rectangular Stator Tiles

Figure 10A:
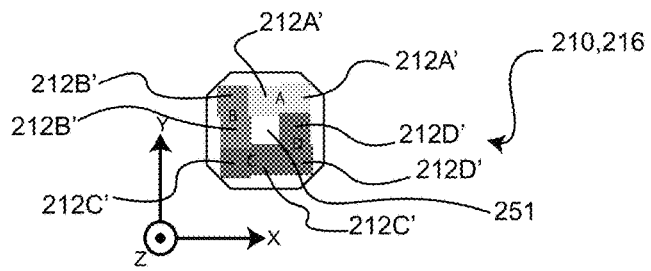
FIG. 10A is a schematic depiction of moveable stage and a magnet array assembly according to a particular embodiment.

FIG. 10A shows a non-limiting embodiment of a moveable stage 210 and a corresponding magnet array assembly 216 according to a particular embodiment. Magnet array assembly 216 comprises a plurality (e.g. four in the illustrated embodiment) of magnet arrays 212A, 212B, 212C, 212D (collectively, magnet arrays 212). For brevity, magnet arrays 212A, 212B, 212C, 212D of the FIG. 10A magnet array assembly 216 may be referred to as magnet arrays A, B, C, D. Magnet array assembly 216 is an elongated segment magnet array assembly 216 comprising a plurality of elongated magnet arrays 212. Magnet array assembly 216 is similar to magnet array assembly 116B (FIG. 3B) described above, except that magnet array assembly 216 is a right-handed magnet array assembly 216, whereas magnet array assembly 116B (FIG. 3B) is a left-handed magnet array assembly 116B. Magnet arrays B and D are elongated in the stage-y direction, and each comprise a plurality of linearly-elongated magnetization segments 214 (see FIG. 10E) with magnetization directions orthogonal to their stage-y elongation direction. Magnet arrays A and C are elongated in the stage-x direction, and each comprise a plurality of linearly-elongated magnetization segments 214 (see FIG. 10E) with magnetization directions orthogonal to their stage-x elongation direction. Although FIG. 10E shows a y-magnet array 212B, it should be appreciated that x-magnet arrays A, may have characteristics similar to those of the FIG. 10E y-magnet array 212B, with appropriate modification to the directions.

In the particular case of the illustrated embodiment shown in FIG. 10A, x-magnet arrays A and C are each split by a middle plane oriented in stage-y/stage-z direction to provide magnet array A with a pair of x-sub-arrays 212A' and to provide magnet array C with a pair of x-sub-arrays 212C'. X-sub-arrays 212A' of the FIG. 10 embodiment are offset from one another in the stage-y direction by an amount $\lambda/10$ which may tend to attenuate fifth-order harmonic field distortion. X-sub-arrays 212C' of the FIG. 10 embodiment are similarly offset from one another in the stage-y direction by an amount $\lambda/10$ which may tend to attenuate fifth-order harmonic field distortion on the x-coil traces. Each x-sub-array 212A', 212C' of the FIG. 10 embodiment has a stage-y-direction width $W_{my}$ of $\lambda$ and a stage-x direction length of $2\lambda$, although this is not necessary. Similarly, in the particular case of the illustrated embodiment shown in FIG. 10A, y-magnet arrays B and D are each split by a middle plane oriented in stage-x/stage-z direction to provide magnet array B with a pair of y-sub-arrays 212B' and to provide magnet array D with a pair of y-sub-arrays 212D'. Y-sub-arrays 212B', 212D' of the FIG. 10 embodiment may offset from one another in the stage-x direction by an amount $\lambda/10$ which may tend to attenuate fifth-order harmonic field distortion on the y-coil traces. Each y-sub-array 212B', 212D' of the FIG. 10 embodiment has a stage-x-direction width $W_{mx}$ of $\lambda$ and a stage-y direction length of $2\lambda$, although this is not necessary. The division of magnet arrays A, B, C, D into offset sub-arrays 212A', 212B', 212C', 212D' is not necessary. In some embodiments, magnet arrays A, B, C, D are similar to any of the other elongated segment magnet arrays described herein. Magnet array assembly 216 may comprise a space 251 having dimensions Sx=Sy=$\lambda$ between the adjacent edges of its magnet arrays A, B, C, D and offsets Ox=Oy=$\lambda$ between corresponding edges of its magnet arrays A, B, C, D. Moveable stage 210 may comprise bumper components (not explicitly enumerated) similar to those described above for moveable stage 10.

Figure 10B:
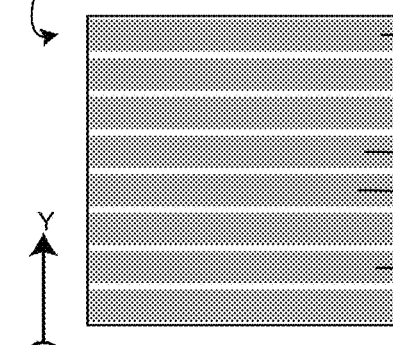
FIG. 10B shows an x-trace layer corresponding to a stator tile (excitation region) of a stator according to a particular embodiment.
Figure 10C:
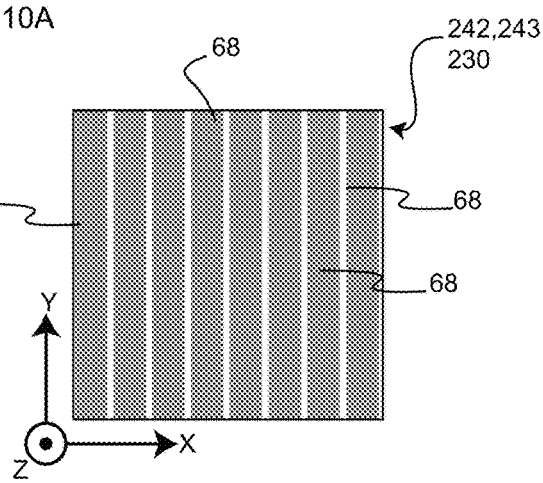
FIG. 10C shows a y-trace layer corresponding to the stator tile (excitation region) of the FIG. 10B stator according to a particular embodiment.
Figure 10D:
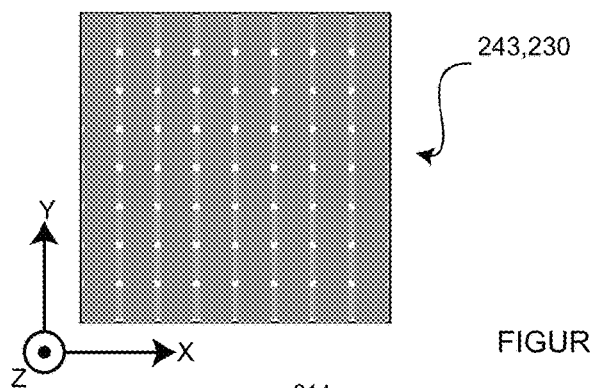
FIG. 10D is a schematic depiction of the entire stator tile incorporating the FIG. 10B x-trace layer and the FIG. 10C y-trace layer.
Figure 10E:
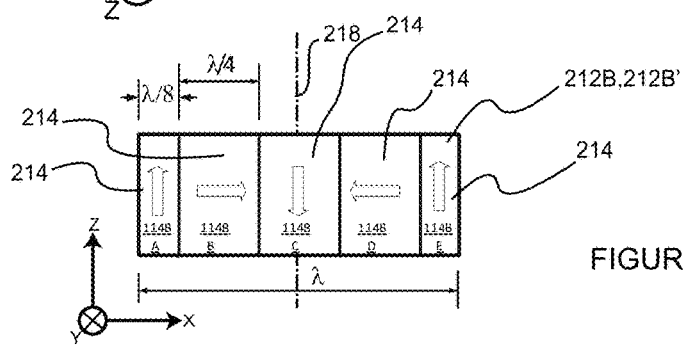
FIG. 10E is a cross-sectional view of one of the y-magnet arrays of the FIG. 10A magnet array assembly.

FIG. 10B shows an x-trace layer 240 in a stator tile (excitation region) 243 of a stator 230 which may be used in conjunction with the FIG. 10A moveable stage 210. X-trace layer 240 of stator tile 243 comprises a plurality of x-trace groups 66, where each x-trace group 66 has a stator-y direction width $W_{gy}=\lambda$ and comprises a plurality of x-traces (not explicitly enumerated) which can be energized (i.e. into which currents can be driven) independently of the other x-trace groups 66. In one particular embodiment, each x-trace group 66 comprises six x-traces connected so that current can be driven into the six x-traces by one three-phase amplifier 70 in a manner similar to that described above in connection with FIG. 8B. FIG. 10C shows a y-trace layer 242 in a stator tile (excitation region) 243 of a stator 230 which may be used in conjunction with the FIG. 10A moveable stage 210. Y-trace layer 242 of stator tile 243 comprises a plurality of y-trace groups 68, where each y-trace group 68 has a stator-x direction width $W_{gx}=\lambda$ and comprises a plurality of y-traces (not explicitly enumerated)

which can be energized (i.e. into which currents can be driven) independently of the other y-trace groups 68. In one particular embodiment, each y-trace group 68 comprises six y-traces connected so that current can be driven into the six y-traces by one three-phase amplifier 70 in a manner similar to that described above in connection with FIG. 8B. FIG. 10D shows a top view of an overall stator tile 243 of stator 230, which comprise a plurality of trace layers including x-trace layer 240 (FIG. 10B) and y-trace layer 242 (FIG. 10C). In FIG. 10C, x-trace layer 240 and y-trace layer 242 overlap with one another in the stator z-direction over the extent of stator tile 243 in the stator-x/stator-y directions. The stator-z direction order of x-trace layer 240 and y-trace layer 242 may be interchanged in some embodiments. Additional x-trace layer(s) 240 and/or y-trace layer(s) may be provided in some embodiments.

FIG. 10E shows a stage-x/stage-z cross-sectional side view of magnet array 212B (or one of its sub-arrays 212B') in the FIG. 10A moveable stage 210. Comparing FIG. 10E to FIG. 3C, it can be seen that magnet array 212B comprises features substantially similar to those of magnet array 112B described above in connection with FIG. 3C. Magnet array 212B contains two edge magnetization segments 214 with widths that are half widths of inner magnetization segments 214. In each sub-array 212B' of the FIG. 10E embodiment, there are $N_t=4$ different magnetization directions, and the widths of inner magnetization segments 214 is $\lambda/N_t$ and the widths of edge magnetization segments 214 is $\lambda/2N_t$. Generally, $N_t$ can be any integer number greater than 1. Each sub-array 212B' is symmetric about a plane 218 extending in stage-y and stage-z and passing through the stage-x dimension center of sub-array 212B'. Other magnet arrays 212A, 212C, 212D of magnet array assembly 216 may have similar features. Other than for their locations, the sub-arrays in one magnet array of magnet array assembly 216 may be identical.

Figure 11A:
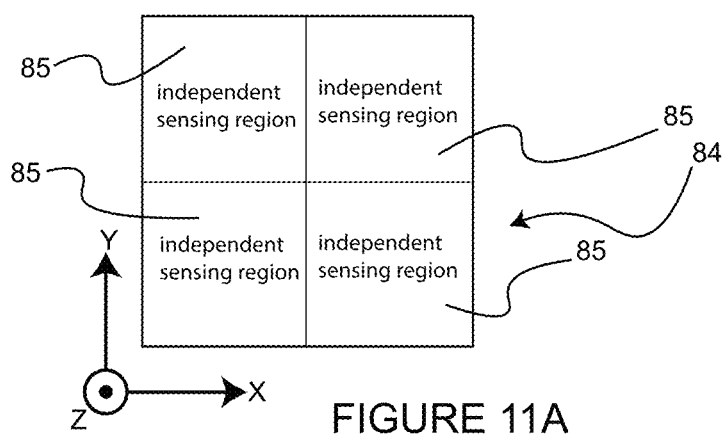
FIG. 11A shows a position sensing layer corresponding to a stator tile (excitation region) of the FIG. 10 stator.
Figure 11B:
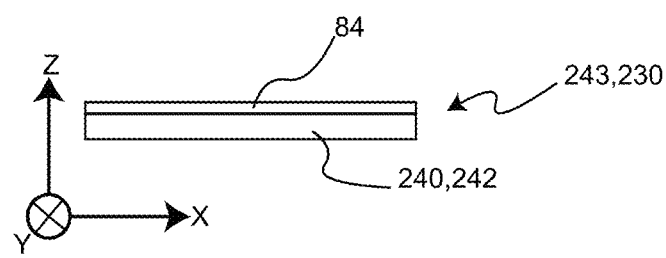
FIG. 11B shows a side of a stator tile, which includes a position sensing layer atop a number of coil trace layers according to a particular embodiment.

FIG. 11A shows a position sensing layer 84 corresponding to a stator tile (excitation region) 243 of the FIG. 10 stator 230. Each position sensing layer 84 corresponding to each stator tile 243 comprises a plurality (e.g. four in the case of the FIG. 11A embodiment) of independent position sensing regions 85. Each position sensing region 85 may comprise a sensing system 80 similar to sensing system 8 described above in connection with FIG. 9. For example, in each position sensing region 85, a plurality of magnetic field sensing elements 82 or other suitable elements are distributed in a matrix format 83 to measure moveable stage 210 positions (or other characteristics, as described above), independently from other position sensing regions 85. FIG. 11B shows a side view of a stator tile 243, which includes a position sensing layer 84 atop a number of coil trace layers 240, 242. Although position sensing layer 84 is shown on the positive stator-z side of coil trace layers 240, 242 in the FIG. 11 embodiment, this is not necessary. In some embodiments, position sensing layer 84 may additionally or alternatively be located on the negative stator-z side of coil trace layers 240, 242 as described, for example, in Patent Cooperation Treaty application No. PCT/CA2014/050739.

Figure 12:
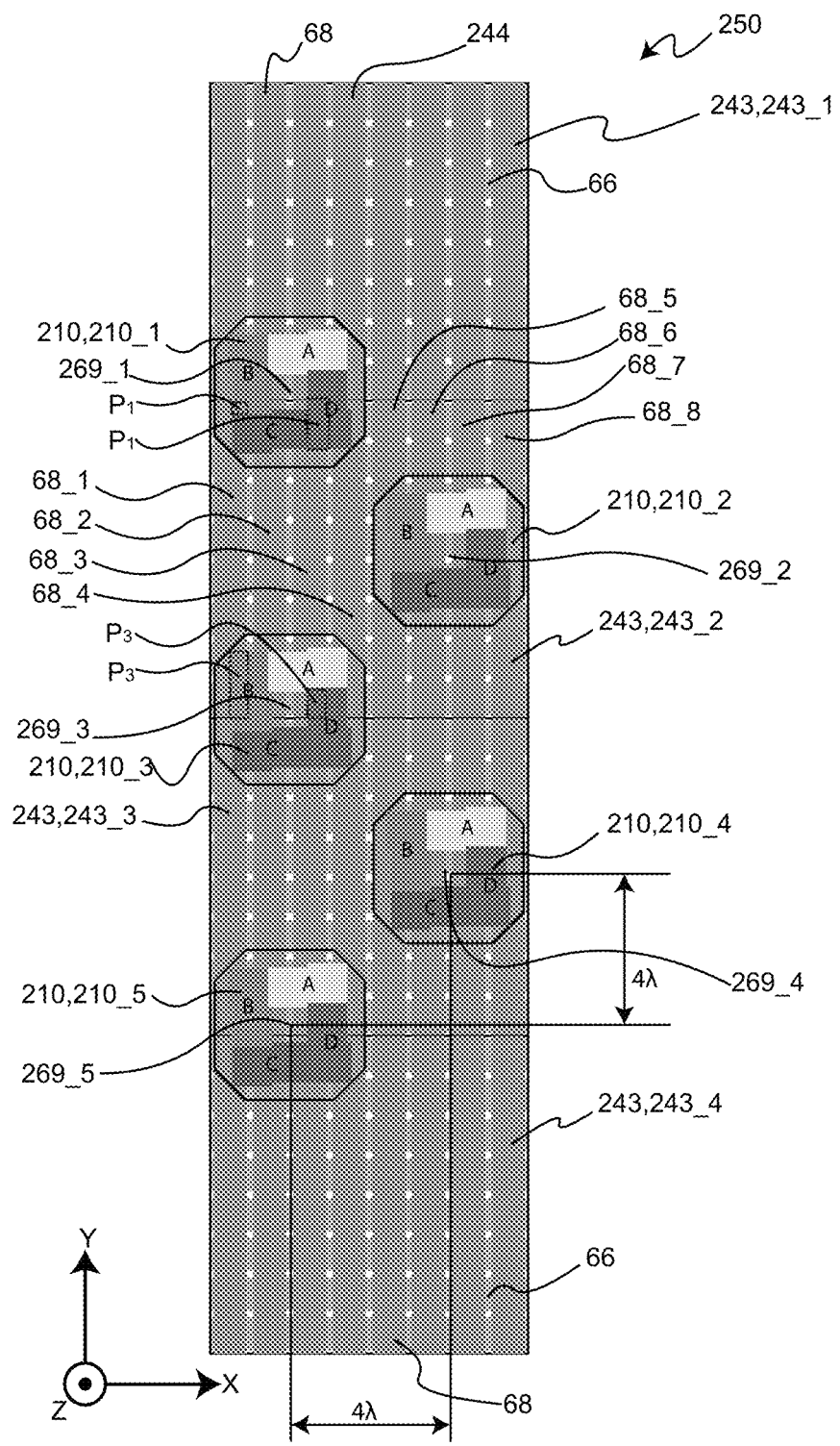
FIG. 12 shows a non-limiting embodiment of a displacement device according to the FIG. 10 embodiment, which comprises a plurality of moveable stages and a plurality of stator tiles (excitation regions).

FIG. 12 shows a non-limiting embodiment of a displacement device 250 according to another particular embodiment of the invention. Displacement device 250 of the illustrated FIG. 12 embodiment comprises a plurality (e.g. five in the case of the illustrated embodiment) of moveable stages 210 and a stator 230 comprising a plurality (e.g. four in the case of the illustrated embodiment) of stator tiles (excitation regions) 243. Multiple stator tiles 243 can form a stator lane or other patterns (which may be arbitrary and which may be suited for particular applications). In this description and the accompanying claims, a stator lane (or, for brevity, a lane) may be defined as a plurality of stator tiles 243 arranged edge to edge and adjacent to one another to form a line in the stator-x or stator-y direction. In the particular case of the FIG. 12 example embodiment, stator 230 comprises a stator lane 244 wherein the x-oriented edges of a plurality of stator tiles 243 are arranged to abut against one another to provide a stator lane 244 that extends in a line in the stator-y direction. In FIG. 12 and this description, individual moveable stages 210 and individual stator tiles 243 may be indexed by an additional reference number to distinguish individual moveable stages 210 and individual stator tiles 243 from one another, where such distinction is desired. For example, the individual moveable stages 210 shown in the FIG. 12 example embodiment may be individually referred to as moveable stages 210_1, 210_2, 210_3, 210_4 and 210_5 and the individual stator tiles (excitation regions) 243 in the FIG. 12 example embodiment may be referred to as stator tiles (excitation regions) 243_1, 243_2, 243_3, 243_4.

When any two moveable stages 210 of displacement device 250 are arranged (e.g. by controllable movement) without overlap in the stator-x direction and without overlap in the stator-y direction (for example, moveable stages 210_2 and 210_3), each moveable stage 210 can be controlled individually and independently in six degrees-of-freedom (DOF)—i.e. translation in x, y, and z and rotation about x, y and z axes. In the particular case of the illustrated FIG. 12 embodiment, each moveable stage 210 comprises a plurality (e.g. 4) magnet arrays 212 and each magnet array 212 is $\lambda$ wide (across its elongation direction), and each stator tile is $8\lambda$ by $8\lambda$ with a plurality (e.g. 4) independent position sensing regions 85. In the particular case of the illustrated FIG. 12 embodiment, two moveable stages 210 of displacement device 250 can be completely independently controlled provided that their magnet array assemblies 216 have center-to-center spacing of not less than $4\lambda$ in the stator-x direction and not less than $4\lambda$ in the stator-y direction. Moveable stages 210 having this spacing may be referred to herein as being controllably adjacent. For example, moveable stage 210_2 and moveable stage 210_3 are controllably adjacent.

By driving currents into suitable coil traces and thereby driving moveable stage 210 with reduced couplings, two moveable stages 210 may be arranged (e.g. by controllable movement) to be overlapping in the stator-x direction or overlapping in the stator-y direction in a single stator tile 243 and the motion (e.g. position) of such moveable stages 210 can still be controlled in six degrees of freedom. For example, in the illustrated moveable stage configuration shown in FIG. 12, moveable stage 210_1 and moveable stage 210_3 are overlapping in the stator-y direction and the motion (e.g. position) of each of moveable stage 210_1 and moveable stage 210_3 can be individually controlled in six degrees of freedom by driving currents into suitable coil traces and driving moveable stages 210_1, 210_3 with reduced couplings. To explain these reduced couplings, we may adopt a convention where a magnet array A, B, C, D of a moveable stage 210_1, 210_2, 210_3, 210_4 may be referred to using a combination of a letter (which refers to a magnet array) and a number which refers to the index of the moveable stage. For example, magnet array B in moveable stage 210_3 may be referred to as magnet array B3.

In the illustrated moveable stage configuration shown in FIG. 12, the stage-x/stage-y centers 269_1, 269_3 of the magnet array assemblies of moveable stages 210_1 and 210_3 are generally aligned with one another in the stator-y direction and are spaced apart from one another by a dimension of stator tiles 243 in the stator-y direction. Even with this alignment in the stator-y direction, the motion (e.g. position) of each of moveable stage 210_1 and moveable stage 210_3 can be individually controlled in six degrees of freedom, where there is sufficient spacing between the aligned moveable stages 210. For example, in the case of the illustrated FIG. 12 embodiment, the stator-y direction spacing of the centers 269_1, 269_3 are spaced apart from one another by a dimension of stator tiles 243 in the stator-y direction (or, in some embodiments, by within 10% of a dimension of stator tiles 243 in the stator-y direction; or, in some embodiments, by within 20% of a dimension of stator tiles 243 in the stator-y direction) and this provides sufficient spacing for independent motion control (in six degrees of freedom) of aligned moveable stages 210_1, 210_3. In the case of the example FIG. 12 embodiment, this control may be achieved by driving magnet array A1 (magnet array A in moveable stage 1) with x-traces in stator tile 243_1, magnet array B1 with y-traces in stator tile 243_1, magnet array C1 with x-traces in stator tile 243_2, so that moveable stage 210_1 can be fully controlled in six DOF. Similarly, by driving magnet array A3 with x-traces in stator tile 243_2, driving magnet array B3 with y-traces in stator tile 243_2, and driving magnet array C3 with x-traces in stator tile 243_3, the motion (e.g. position) of moveable stage 210_3 can be fully controlled in six degrees of freedom.

It may be observed from FIG. 12 that there may be some cross-coupling of forces onto magnet arrays B1 and B3 by the currents driven into the two y-trace groups of stator tile 243_2 that exert force on magnet array B3, since a portion of magnet array B1 overlaps this same pair of y-trace groups of stator tile 243_2 in the stator-z direction. Magnet arrays B1 and B3 may be said to "share" these coil trace groups. In general, two magnet arrays 212 elongated in the same direction (e.g. two x-magnet arrays 212 or two y-magnet arrays 212) may be said to "share" a coil trace group if the coil traces in the coil trace group are elongated generally in the same direction as the two magnet arrays 212 and both magnet arrays 212 overlap corresponding portions of the shared coil trace group in the stator-z direction. In some embodiments or applications, the control techniques described herein may be used where the two magnet arrays 212 which share a coil trace group both overlap (in the stator-z direction) at least one individual coil trace within the shared coil trace group. Magnet arrays 212 which share a coil trace group experience forces which are coupled to one another when current is driven into the shared coil trace group. While magnet arrays B1 and B3 share two y-trace groups, the proportion of magnet array B1 that overlaps these y-trace groups of stator tile 243_2 in the stator-z direction is relatively small compared to the proportion of magnet array B3 that overlaps these y-trace groups of stator tile 243_2 in the stator-z direction. Consequently, the force on magnet array B1 caused by the currents in these shared y-traces may be relatively small and suitable control algorithms can be designed to accommodate such small cross-coupling forces. For example, if we consider the y-trace group 68_1 shared by B1 and B3 in FIG. 12, it can be observed that a portion $P_1$ of the area (planar area extending in the stator-x and stator-y directions) of coil array B1 overlaps shared y-trace group 68_1 in the stator-z direction and that a significantly larger portion $P_3$ of the area of coil array B3 overlaps shared y-trace group 68_1 in the stator-z direction. The currents driven into shared y-trace group 68_1 can be determined based on the positions of both magnet arrays B1 and B3 (or the positions of both of their corresponding moveable stages 210_1, 210_3) as determined by feedback 63. However, because of the different amounts of overlap (i.e. the different sizes of $P_1$ and $P_3$) the currents driven into shared y-trace group 68_1 can be determined based, to a relatively large extent, on desired forces for magnet array B3 and, to a relatively small extent, on desired forces for magnet array B1. In one example, currents driven into shared y-trace group 68_1 can be determined by a weighted force $F_w$ given by $$F_w = \frac{P_3}{P_1 + P_3} F_3 + \frac{P_1}{P_1 + P_3} F_1$$

according to a suitable commutation algorithm, where $F_1$ is a desired force to be imparted on magnet array B1 (determined based on the feedback position of moveable stage 210_1 using a suitable feedback control method) and $F_3$ is a desired force to be imparted on magnet array B3 (determined based on the feedback position of moveable stage 210_3 using a suitable feedback control method). Examples of suitable commutation algorithm and suitable position feedback control method are discussed in PCT application No. PCT/CA2012/050751. When moveable stages 210_1 and 210_3 are moving in the positive or negative stator-y direction while maintaining roughly the same stator-y direction separation, the portions $P_1$ and $P_3$ will also change, and, consequently, so does the relation of $F_w$ to $F_3$ and $F_1$. It will be appreciated by those skilled in the art that magnet arrays B1 and B3 also share y-trace group 68_2 and that a weighted force relationship may be similarly obtained for y-trace group 68_2. More generally, it will also be appreciated that the above weighted force relationship may be suitably modified where different magnet arrays share a coil trace group.

Magnet array D1 and D3 also share two y-trace groups in tile 243_2. Like magnet arrays B1 and B3, any current driven into either of the y-trace groups of stator tile 243_2 shared by magnet arrays D1 and D3 creates coupled forces in magnet arrays D1 and D3. A difference between the situation of magnet arrays D1 and D3 (relative to magnet arrays B1 and B3), is that the portions of magnet arrays D1 and D3 that overlap the shared y-trace groups of stator tile 243_2 in the stator-z direction are relatively similar to one another, whereas the portions of magnet arrays B1 and B3 that overlap the shared y-trace groups of stator tile 243_2 in the stator-z direction are relatively dis-similar. This similarity in the portions of magnet arrays D1 and D3 that overlap the shared y-trace groups of stator tile 243_2 can be seen from FIG. 12 by observing the similarity in the portions $P_1$, $P_3$ of magnet arrays D1, D3 that overlap shared y-trace group 68_3, respectively. In some embodiments or applications, controller 60 may be configured to use a suitable similarity threshold to determine whether the portions of magnet arrays that overlap shared coil trace groups are dis-similar (like magnet arrays B1, B3 of FIG. 12) or similar (like magnet arrays D1, D3 of FIG. 12). Such similarity thresholds may be evaluated based on feedback information 63 obtained by controller 60 (see FIG. 8A) relating to the positions of both moveable stages 210 having magnet arrays 212 that share a coil trace group. For example, in the case of the illustrated embodiment of FIG. 12, a similarity threshold evaluation for y-trace group 68_1 may be based on the ratio $P_1/P_3$ and a suitable threshold P*. For example, if $P_1/P3$ is in a range of 1−P*<$P_1$/P3<1+P*, then the overlapping portions $P_1$, $P_3$ of magnet arrays B1, B3 may be considered to be similar and, otherwise, the overlapping portions $P_1$, $P_3$ of magnet arrays B1, B3 may be considered to be dis-similar. In some embodiments, where the portions of magnet arrays that overlap a shared coil trace group are determined to be dis-similar (like magnet arrays B1, B3 in the FIG. 12 example), currents may be controllably driven into the shared coil-trace group based on the positions of both of the corresponding moveable stages (e.g. from feedback). In some embodiments, where the proportions of magnet arrays that overlap shared coil trace groups are determined to be similar (e.g. like magnet arrays D1, D3 in the FIG. 12 example), no current is driven in the corresponding shared coil trace groups. In some embodiments, where the proportions of magnet arrays that overlap shared coil trace groups are determined to be similar (e.g. like magnet arrays D1, D3 in the FIG. 12 example), currents can be driven into the shared coil trace groups by commanding feed-forward (open-loop) currents and corresponding feed-forward (open-loop) forces. Such open-loop currents and the corresponding forces may help to reduce current/force requirements associated with other magnet arrays (e.g. to achieve performance objectives). Since where the proportions of magnet arrays that overlap shared coil trace groups are determined to be similar (e.g. like magnet arrays D1, D3 in the FIG. 12 example), dynamic coupling between such magnet arrays D1, D3 (and their corresponding moveable stages 210_1, 210_3) can be avoided by refraining from using position feedback control for currents driven into shared coil trace groups—i.e. the current control signals output by controller 60 for the coil trace currents corresponding to the shared coil trace groups are determined independently of position feedback related to the position of the moveable stages 210.

Particular embodiments provide methods and systems for controlling a plurality (e.g. first and second) moveable stages 210 on a particular tile. In some embodiments, where a magnet array 212 from a first moveable stage 210 and a magnet array 212 from a second moveable stage 210 both overlap a shared group of coil traces in the stator-z direction, the currents driven into the shared group of coil traces and used to create forces on overlapping magnet arrays 212 of the first and second moveable stages 210 can be controlled based at least in part on the positions of both first and second moveable stages 210. For example, controller 60 may controllably drive currents into the shared group of coil traces which are based at least in part on the positions of both first and second moveable stages 210. In some embodiments, the currents used to create forces on first and second moveable stages 210 can be controlled to cause first and second moveable stages 210 to pass one another on a stator lane 244 comprising a single row or column of one or more stator tiles 243, without using other stator lanes 244 and/or stator tiles 243. Allowing moveable stages 210 to pass one another is particularly important when moveable stage sequence needs to be changed.

FIGS. 13A-13G (collectively, FIG. 13) illustrate a method for controllably moving first and second moveable stages 210_1, 210_2 to pass one another in a stator lane 244 having a width of a single tile 243 (or to pass one another on a single tile) according to a particular embodiment. In addition to referring to individual magnet arrays 212 as magnet arrays A1,B1,C1,D1 and A2,B2,C2,D2 (as discussed above), this description of FIG. 13, for convenience, refers to individual x-trace groups (referred to using reference number 66 at other places herein) as x-trace groups X1, X2, X3, . . . . In the illustrated example embodiment of FIG. 13, stator tile 243 comprises eight x-trace groups, X1, X2, X3, . . . X8.

Moveable stage 210_1 may be assumed (without loss of generality) to originally be traveling in the negative stator-y direction and moveable stage 210_2 may be similarly assumed to be traveling in the positive stator-y direction and it is assumed that it is desired to have moveable stage 210_1 and 210_2 pass one another in the stator-y direction (i.e. to change their relative positions in the stator-y direction). In a first stage or step illustrated in FIG. 13A, first and second moveable stages 210_1, 210_2 do not overlap one another in the stage-x direction. Moveable stage 210_1 moves in the negative stator-y direction toward meeting plane 246 (extending in the stator-x and stator-z directions and shown as a dashed line in FIG. 13) and moveable stage 210_2 moves in the positive stator-y direction toward meeting plane 246. Each of moveable stages 210_1, 210_2 may be controllably moved to have the same speed $v_m$, although this is not necessary. In the FIG. 13A configuration, each moveable stage 210_1, 210_2 can be actuated with eight independent forces (i.e. two independent forces (either x and z oriented forces; or y and z oriented forces) on each array 212 of each moveable stage 210).

Figures 13A, 13B:
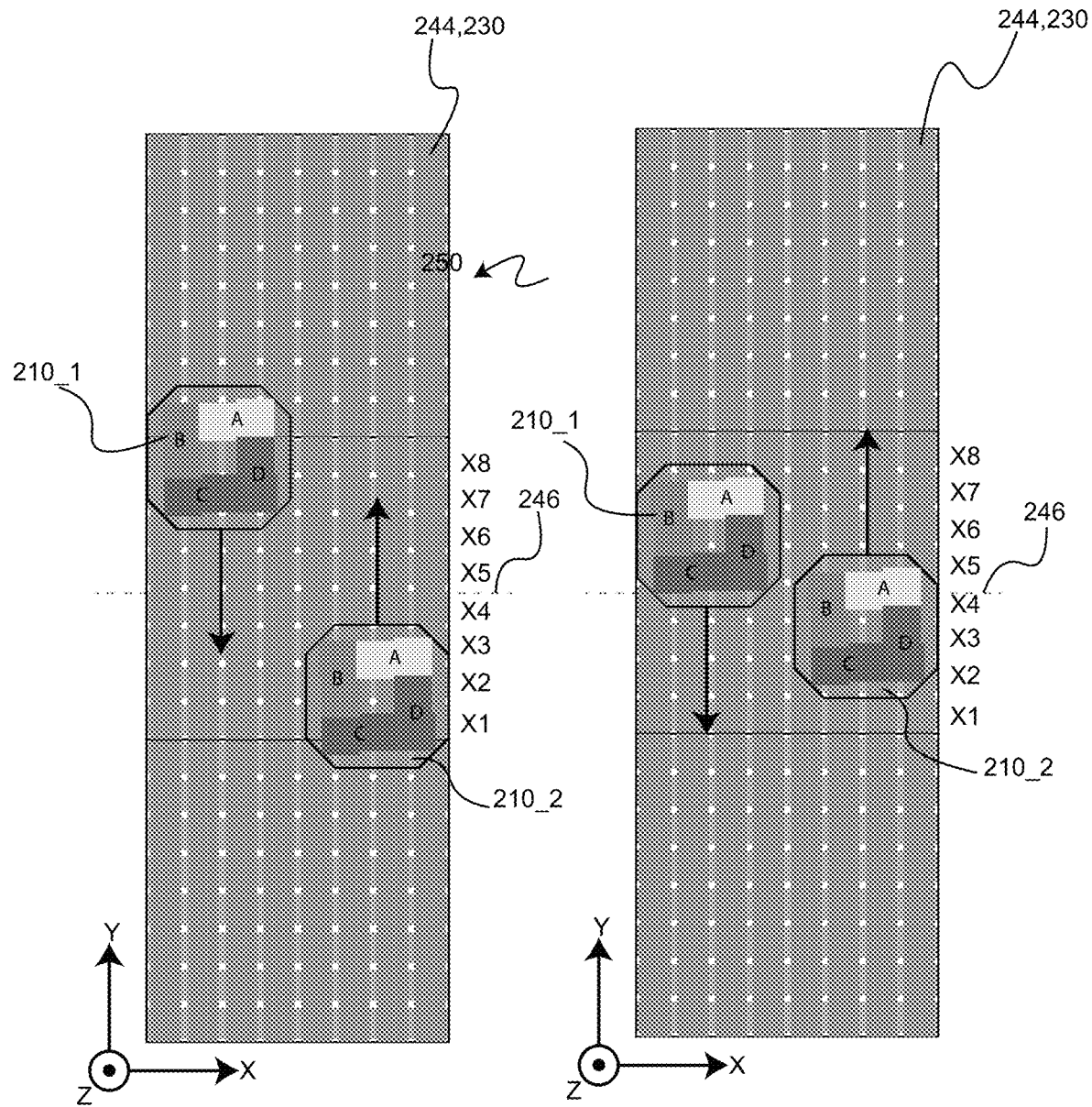
FIGS. 13A-13G (collectively, FIG. 13) illustrate a method for moving first and second moveable stages of the FIG. 10 displacement device to pass one another in a stator lane having a width of a single tile (or to pass one another on a single tile) according to a particular embodiment.

FIG. 13B illustrates a second stage or step where moveable stages 210_1, 210_2 start to overlap one another in the stator-x direction. In the particular case of the illustrated embodiment of FIG. 13B, magnet arrays A2 and C1 start to overlap one another in the stator-x direction and may share x-trace groups X4 and/or X5. In some embodiments, when magnet arrays A2 and C1 start to overlap one another in the stator-x direction (as is the case in FIG. 13B), only three magnet arrays 212 on each moveable stage 210_1, 210_1 have currents driven into their corresponding coil trace groups. Coil traces or coil trace groups may be said to correspond to a magnet array 212 (or vice versa) when the coil traces or coil trace groups and the magnet array 212 overlap one another in the stator-z direction. In some embodiments, in the particular case of the FIG. 13B configuration, only three magnet arrays 212 on each moveable stage 210_1, 210_2 have currents driven into their corresponding coil trace groups. In particular, currents are driven into the coil trace groups corresponding to magnet arrays A1, B1, D1, B2, C2, D2, and, in some embodiments, no currents are driven into the x-trace groups X4, X5 corresponding to, and shared by, magnet arrays C1, A2, since such currents may cause cross-coupling of forces between magnet arrays C1, A2. In some embodiments, rather than driving no currents into x-trace groups X4, X5, x-trace groups X4, X5 may be driven open-loop with the same non-zero currents (e.g. for the case of three-phase currents, phase A driven into x-trace group X4 is the same current as phase A driven into x-trace group X5; phase B driven into x-trace group X4 is the same current as phase B driven into x-trace group X5; phase C driven into x-trace group X4 is the same current as phase C driven into x-trace group X5). The FIG. 13B configuration may last until magnet arrays A1 and A2 start to overlap one another in the stator-x direction.

Figure 13C:
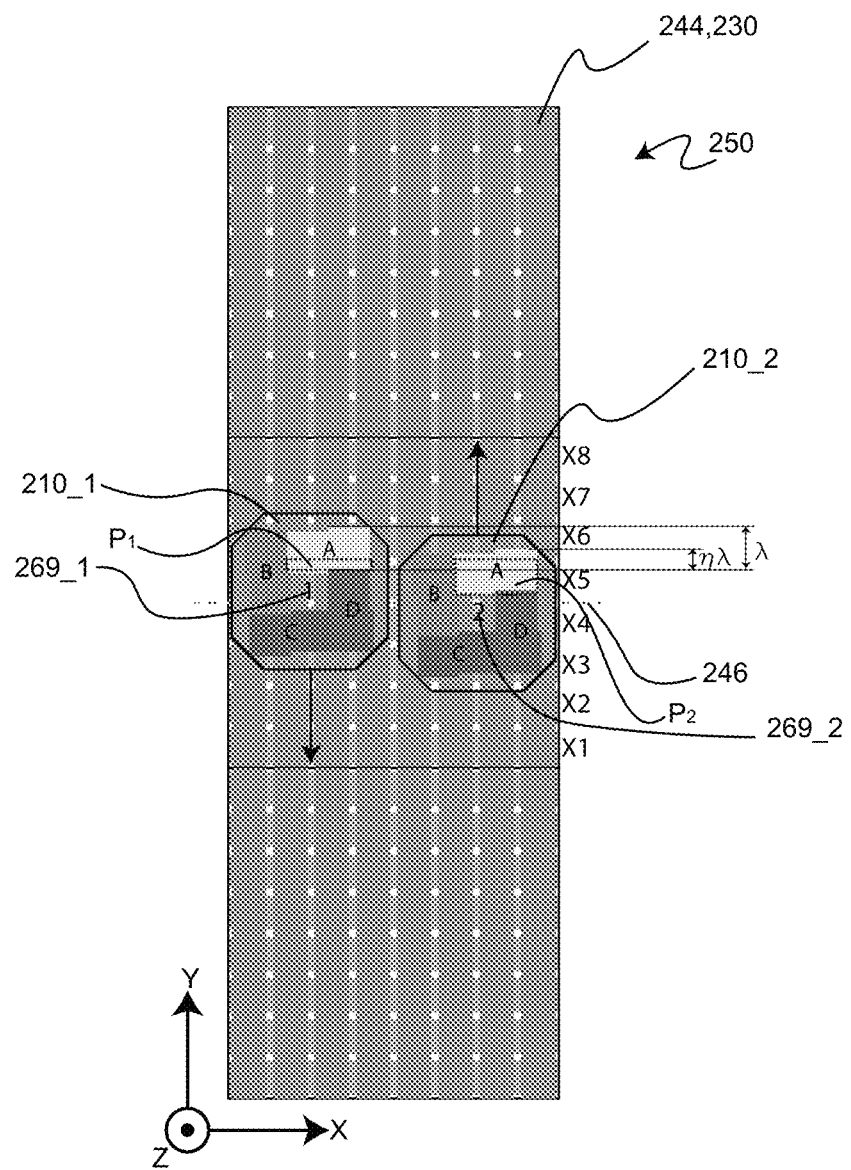

FIG. 13C shows a third step or configuration, where magnet arrays A1 and A2 (and also magnet arrays C1 and C2) start to overlap one another in the stator-x direction. In the particular case of the illustrated embodiment of FIG. 13C, magnet arrays A1, A2 start to overlap one another in the stator-x direction and may share (i.e. overlap in the stator-z direction with) x-trace groups X5 and/or X6 and magnet arrays C1, C2 start to overlap one another in the stator-x direction and may share (i.e. overlap in the stator-z direction with) x-trace groups X3 and X4. As shown in FIG. 13C, while the x/y centers 269_1, 269_2 of both moveable stages 210_1, 210_2 have not yet passed notional meeting line 246, we can define the width (as measured in the stator-y direction) which magnet arrays A1 and A2 overlap one another in the stator-x direction to be ηλ, where η is an overlapping factor (either a fraction 0<η≤1 or a percentage 0%<η≤100%) and λ is the width (as measured in the stator-y direction) of magnet array A1 and A2. As noted above, in some embodiments, x-magnet arrays A1, A2 may be provided with y direction widths $W_{my}$, which need not be equal to λ. In such embodiments, the width (as measured in the stator-y direction) which magnet arrays A1 and A2 overlap one another in the stator-x direction may be $\eta W_{my}$, where η is an overlapping factor (either a fraction 0<η≤1 or a percentage 0%<η≤100%) and $W_{my}$ is the width (as measured in the stator-y direction) of magnet array A1 and A2. It will be appreciated that η is a function of the positions of moveable stages 210_1, 210_2 (or their magnet arrays A1, A2) and is particularly related to their stator-y positions. For 0<η<η*, where η* is a suitable threshold (e.g. greater than 50% in some embodiments, greater than 70% in some embodiments, greater than 80% in some embodiments and greater than 90% in some embodiments): a proportion (1−η/2) of the stage-y dimension of magnet array A1 corresponds to (i.e. overlaps in the stator-z direction with) x-trace group X6 (see FIG. 13C) and the remaining proportion (η/2) of the stage-y dimension of magnet array A1 corresponds to x-trace group X5; and a proportion (1−η/2) of the stage-y dimension of magnet array A2 corresponds to (i.e. overlaps in the stator-z direction with) x-trace group X5 and the remaining proportion (η/2) of the stage-y dimension of magnet array A2 corresponds to x-trace group X6. In the particular case of the illustrated embodiment shown in FIG. 13C, the entire stage-x dimensions of magnet arrays A1, A2 overlap the shared x-trace groups X5, X6 and, as a result, the above-described proportions of the stage-y dimensions of magnet arrays A1, A2 correspond to similar proportions of the areas of magnet arrays A1, A2. The threshold η* may be configurable (e.g. operator configurable) in some embodiments.

In the FIG. 13C configuration, currents in x-trace groups X5 and X6 can be controllably driven in such a way that two independent (y and z oriented) forces are generated on magnet array A1 and another two independent (y and z oriented) forces are generated on magnet array A2. In the FIG. 13C configuration, where 0<η<η*, controller 60 determines the currents driven into coil trace groups X5, X6 (i.e. the coil trace groups shared by magnet arrays A1, A2) based on the positions of both moveable stages 210_1 and 210_2 (i.e. the moveable stages comprising the overlapping magnet arrays A1 and A2) and causes these currents to be driven into the shared coil trace groups X5, X6. This contrasts with conventional control of a single moveable stage, where the currents used to controllably move the single moveable stage are based only on the position of the single moveable stage. In the case of the FIG. 13C configuration, in some embodiments, controller 60 may determine the currents to be driven into the shared coil trace group X6 based on a proportion (1−η/2) of a stage-y dimension of magnet array A1 that overlaps with the shared coil trace group X6 in the stator-z direction and based on a proportion η/2 of a stage-y dimension of magnet array A2 that overlaps with shared coil trace group X6 in the stator-z direction. Similarly, in the case of the FIG. 13C configuration, in some embodiments, controller 60 may determine the currents to be driven into the shared coil trace group X5 based on a proportion η/2 of a stage-y dimension of magnet array A1 that overlaps with the shared coil trace group X5 in the stator-z direction and based on a proportion (1−η/2) of a stage-y dimension of magnet array A2 that overlaps with shared coil trace group X5 in the stator-z direction. The currents driven into shared x-trace groups X5, X6 may be determined based on the desired force to be applied to magnet array A1, the desired force to be applied to magnet array A2 and the positions (e.g. as determined by feedback) of moveable stages 210_1, 210_2. The desired forces on magnet arrays A1 and A2 may be determined from their respective position control algorithms which may control the motion of their respective movers 210_1, 210_2 in six degrees of freedom. For example, in the case of shared x-trace group X5, $P_1$ represents the portion of magnet array A1 that overlaps x-trace group X5 and $P_2$ represents the portion of magnet array A2 that overlaps x-trace group X5. It will be appreciated that $P_1$ and $P_2$ depend on the positions of moveable stages 210_1, 210_2. Like the above-described situation in FIG. 12, the currents driven into the shared coil trace X5 can be determined according to a weighted force $$F_w = \frac{P_2}{P_1 + P_2} F_2 + \frac{P_1}{P_1 + P_2} F_1$$

according to a suitable commutation algorithm, where $F_1$ is the desired force on magnet array A1 calculated based on feedback positions of moveable stage 210_1 using a suitable position feedback control method, $F_2$ is the desired force on magnet array A2 calculated based on feedback positions of moveable stage 210_2 using a suitable position feedback control method. Examples of suitable commutation algorithm and suitable position feedback control method are discussed in PCT application No. PCT/CA2012/050751. In general, the current for a coil trace group current may be determined from a desired weighted force $F_w$ according to a commutation law, the weighted force $F_w$ may be determined from $F_1$, $F_2$ (for FIG. 13C case), $F_1$ and $F_2$ are desired forces on magnet arrays A1 and A2 which may be determined from the positions of moveable stages 210_1, 210_2 (e.g. from feedback). When moveable stages 210_1 and 210_2 are moving in the negative stator-y and positive stator-y directions respectively, $P_1$ and $P_2$ will also change accordingly, and so does the relation of $F_w$ to $F_2$ and $F_1$. In the particular case of the FIG. 13C situation, the entire stage-x dimension lengths of magnet arrays A1, A2 overlap the shared coil trace group X5 and are equal to one another. Consequently, the relative overlapping portions $P_1$, $P_2$ may be reduced to the above-discussed proportions, where $P_1$ is proportional to η/2 and $P_2$ is proportional to (1−η/2), such that the above weighted force formula for x-trace group X5 reduces to $F_w = (1-\eta/2) F_2 + \eta/2\ F_1$ It will be appreciated that analogous control techniques may be used to determine the currents for the shared x-trace group X6.

Similarly, currents in shared x-trace groups X3 and X4 can be determined based on the positions of moveable stages 210_1, 210_2 and driven in such a way that two independent forces are generated on magnet array C1 and two independent forces are generated on magnet array C2. As a result, in the configuration of FIG. 13C (e.g. with x-magnet arrays A1, A2 overlapping in the stator-x direction and x-magnet arrays C1, C2 overlapping in the stator-x direction), the motion (e.g. positions) of moveable stages 210_1, 210_2 can still be controlled with six degrees of freedom with suitably controlled currents and suitably controlled forces being applied to each of the magnet arrays 212 of each moveable stage 210_1, 210_2. In particular, moveable stage 210_1 can still be controllably forced in the negative stator-y direction and moveable stage 210_2 can still be controllably forced in the positive stator-y direction.

Figures 13D, 13E:
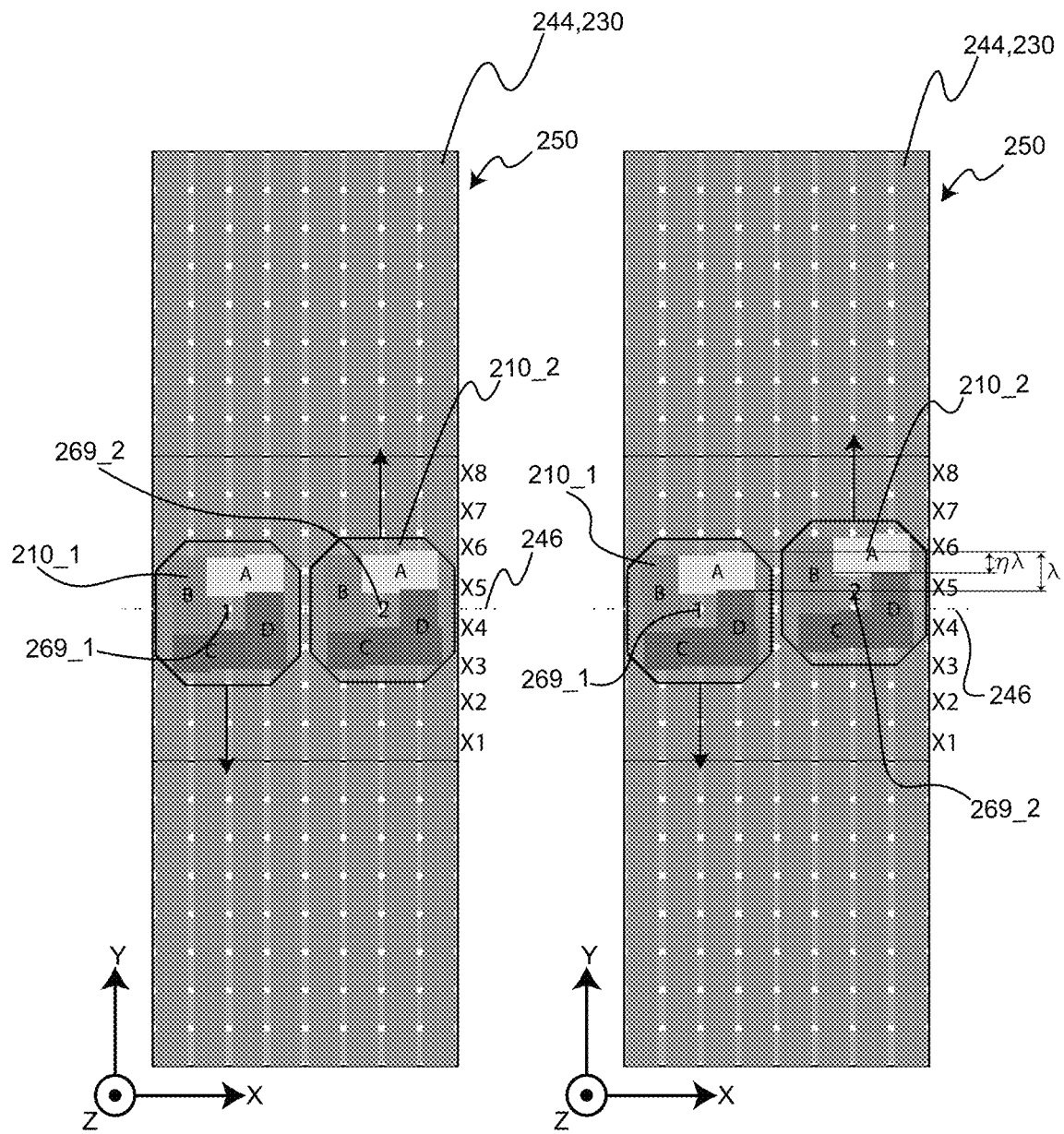

When moved in this manner, moveable stages eventually reach the threshold overlap factor η*—i.e. where the overlap factor η between magnet arrays A1, A2 or between magnet arrays C1, C2 is in a range of η*≤η≤1. The configuration corresponding to this next step is schematically illustrated in FIG. 13D. In the FIG. 13D configuration, where η*≤η≤1, x-trace groups X5 and X6 may be driven open-loop with the same non-zero currents (e.g. for the case of three-phase currents, phase A driven into x-trace group X5 is the same current as phase A driven into x-trace group X6; phase B driven into x-trace group X5 is the same current as phase B driven into x-trace group X6; phase C driven into x-trace group X5 is the same current as phase C driven into x-trace group X6). Driving these same non-zero currents can be used to generate a feed-forward (open-loop) stator-z oriented force as if η=1 or η=100%. Such open-loop currents driven into x-trace groups X5, X6 may be the same (and not changing relative to one another) throughout the FIG. 13D configuration where η*≤η≤1. Similarly methods may be used to drive the same open-loop non-zero currents into x-trace groups X3, X4 to thereby drive magnet arrays C1, C2. In some embodiments, for the configuration where η*≤η≤1, the currents driven into the coil-trace groups (e.g. X5, X6 and/or X3, X4) shared by magnet arrays that overlap one another in a stator direction (e.g. A1, A2 and/or C1, C2) may be set to zero. In the FIG. 13D configuration, where η*≤η≤1, first and second moveable stages 210_1, 210_2 may continue to travel in the respective directions that they were traveling prior to the FIG. 13D configuration (e.g. first moveable stage 210_1 may continue to travel in the negative stator-y direction and second moveable stage 210_2 may continue to travel in the positive stator-y direction) and may pass each other due to their momentum. During the FIG. 13D configuration, where η*≤η≤1, controller 60 may continue to controllably drive currents into the y-trace groups corresponding to magnet arrays B1, D1 and B2, D2 and may thereby control the motion (e.g. position) of each moveable stage 210_1, 210_2 with 4 degrees of freedom. For example, in the case of the illustrated embodiment of FIG. 13D, controller 60 could still controllably drive currents into the y-trace groups corresponding to magnet arrays B1, D1 and B2, D2 to control the translation in (x,z) and rotation in (ry$_r$, rz$_r$). Further, rotation motion around the y axis (i.e. ry$_r$) may be passively stabilized by the open-loop non-zero currents driven into x-coil trace groups X3, X4, X5, X6.

The FIG. 13D situation continues until η=1 or η=100%, which corresponds to the situation where magnet arrays A1, A2 substantially completely overlap one another in the stator-x direction and magnet arrays C1, C2 substantially completely overlap one another in the stator-x direction. Due to the continued momentum of moveable stages 210_1, 210_2 may continue to travel in the respective directions that they were traveling prior to the FIG. 13D configuration (e.g. first moveable stage 210_1 may continue to travel in the negative stator-y direction and second moveable stage 210_2 may continue to travel in the positive stator-y direction). Accordingly, once the overlap factor reaches η=1 or η=100%, the overlap factor η will start to reduce as the centers 269_1, 269_2 of moveable stages 210_1, 210_2 pass notional meeting line 246. In the circumstance where η is decreasing and η*≤η≤1, controller 60 may be configured to use the same current driving techniques as those discussed above for FIG. 13D (i.e. where the only difference is that η is increasing in the FIG. 13D context).

At some stage, the overlap factor η may again fall back below the threshold value η*. This step or configuration is shown in FIG. 13E, where 0<η<η*. In the FIG. 13E configuration: a proportion (1−η/2) of the stator-y dimension of magnet array A1 corresponds to (i.e. overlaps in the stator-z direction with) x-trace group X5 (see FIG. 13E) and the remaining proportion (η/2) of the stator-y dimension of magnet array A1 corresponds to x-trace group X6; and a proportion (1−η/2) of the stator-y dimension of magnet array A2 corresponds to (i.e. overlap in the stator-z direction with) x-trace group X6 and the remaining proportion (η/2) of the stator-y dimension of magnet array A2 corresponds to x-trace group X5. In the particular case of the illustrated embodiment shown in FIG. 13E, the entire stage-x dimensions of magnet arrays A1, A2 overlap the shared x-trace groups X5, X6 and, as a result, the above-described proportions of the stage-y dimensions of magnet arrays A1, A2 correspond to similar proportions of the areas of magnet arrays A1, A2. The threshold η* may be configurable (e.g. operator configurable) in some embodiments. In this regard, the FIG. 13E step/configuration is similar to that of FIG. 13C, where currents in x-trace groups X5 and X6 can be controllably determined and driven using techniques analogous to those described above in connection with FIG. 134C and in such a way that two independent (y and z oriented) forces are generated on magnet array A1 and another two independent (y and z oriented) forces are generated on magnet array A2. In the FIG. 13E configuration, where 0<η<η*, controller 60 determines the currents driven into coil trace groups X5, X6 (i.e. the coil trace groups shared by magnet arrays A1, A2) based on the positions of both moveable stages 210_1 and 210_2 (i.e. the moveable stages comprising the overlapping arrays A1 and A2) and causes these currents to be driven into the shared coil trace groups X5, X6. This contrasts with conventional control of a single moveable stage, where the currents used to controllably move the single moveable stage are based only on the position of the single moveable stage. In some circumstances, controller 60 may determine the currents to be driven into the shared coil trace groups X5, X6 based on a proportion (1−η/2) of a stage-y dimension of magnet array A1 that overlaps with the shared coil trace group X5 in the stator-z direction and based on a proportion η/2 of a stage-y dimension of magnet array A2 that overlaps with shared coil trace group X5 in the stator-z direction. Similarly, currents in shared x-trace groups X3 and X4 can be determined and driven in such a way that two independent forces are generated on magnet array C1 and two independent forces are generated on magnet array C2. As a result, in the configuration of FIG. 13E (e.g. with x-magnet arrays A1, A2 overlapping in the stator-x direction and x-magnet arrays C1, C2 overlapping in the stator-x direction), the motion (e.g. the positions) of moveable stages 210_1, 210_2 can still be controlled with six degrees of freedom with suitably controlled currents and suitably controlled forces being applied to each of the magnet arrays 212 of each moveable stage 210_1, 210_2. In particular, moveable stage 210_1 can still be controllably forced in the negative stator-y direction and moveable stage 210_2 can still be controllably forced in the positive stator-y direction.

Figures 13F, 13G:
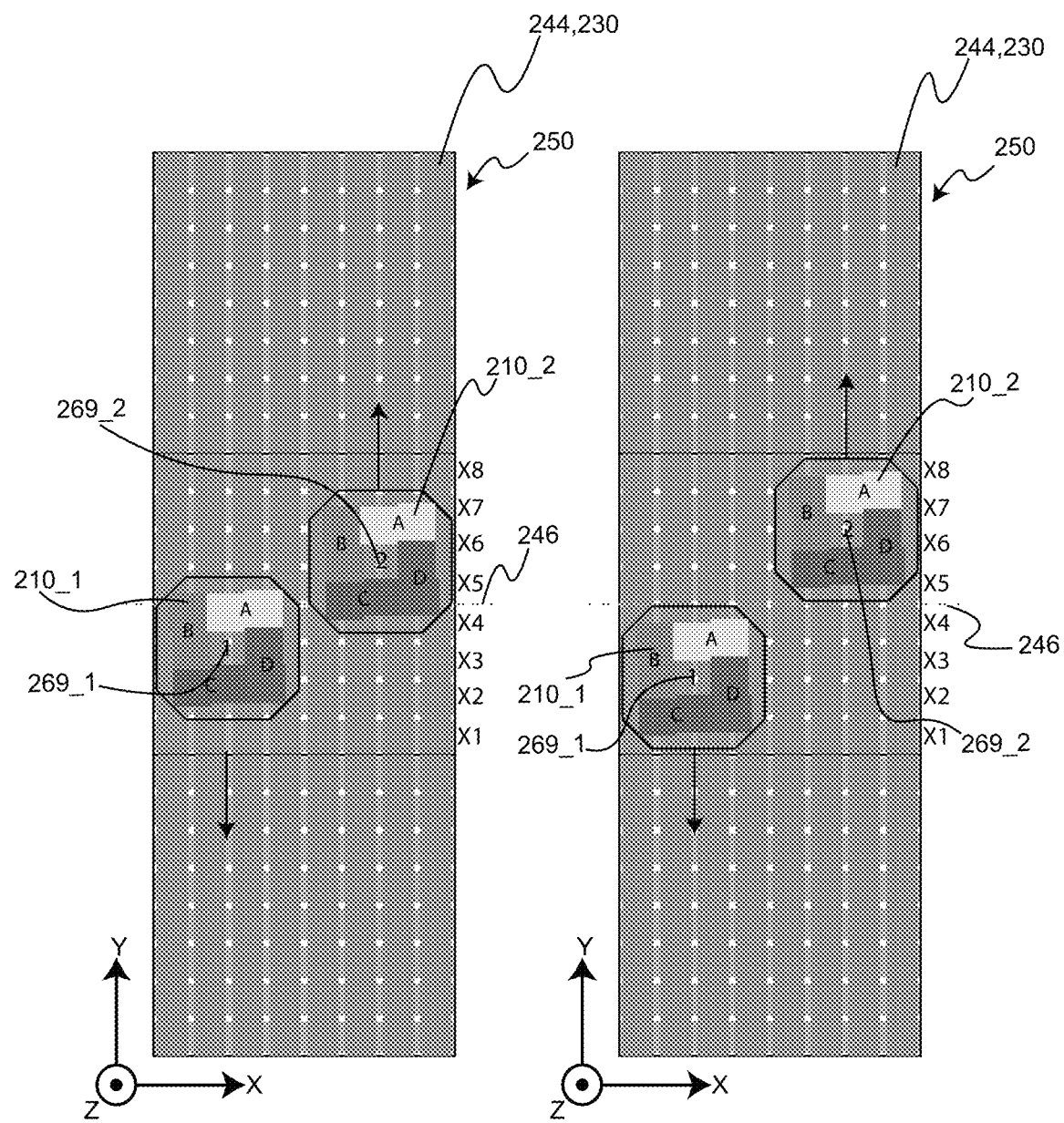

As moveable stage 210_1 continues to move in the negative stator-y direction and moveable stage 210_2 continues to move in the positive stator-y direction, moveable stages 210_1, 210_2 may reach the configuration of FIG. 13F, where magnet arrays A1, A2 no longer overlap and magnet arrays C1, C2 no longer overlap, but where magnet arrays A1 and C2 overlap with one another in the stator-x direction. This FIG. 13F step or configuration may be similar to that of FIG. 13B described above, except that rather than magnet arrays C1 and A2 overlapping in the stator-x direction (as was the case in FIG. 13B), magnet arrays A1 and C2 overlap in the configuration of FIG. 13F. Control strategies analogous to those discussed above in connection with FIG. 13B may be employed in the circumstances of FIG. 13F. In particular, in some embodiments, in the FIG. 13F configuration, only three magnet arrays 212 on each moveable stage 210_1, 210_2 have currents driven into their corresponding coil trace groups. In particular, currents are driven into the coil trace groups corresponding to magnet arrays C1, B1, D1, A2, B2, D2, and, in some embodiments, no currents are driven into the x-trace groups X4, X5 corresponding to, and shared by, magnet arrays A1, C2, since such currents may cause cross-coupling of forces between magnet arrays A1, C2. In some embodiments, rather than driving no currents into x-trace groups X4, X5, x-trace groups X4, X5 may be driven open-loop with the same non-zero currents (e.g. for the case of three-phase currents, phase A driven into x-trace group X4 is the same current as phase A driven into x-trace group X5; phase B driven into x-trace group X4 is the same current as phase B driven into x-trace group X5; phase C driven into x-trace group X4 is the same current as phase C driven into x-trace group X5).

While it was not discussed above in connection with the FIG. 13B configuration, in some embodiments, either of the FIGS. 13B and 13F configurations could use a control strategy similar to that described above for the configurations shown in FIGS. 13C, 13D and 13E. For example, an overlap factor $\eta$ and an overlap threshold $\eta^*$ could be defined between the overlapping magnet arrays (C1, A2 in the case of FIG. 13B; and A1, C2 in the case of FIG. 13F) and then control strategies similar to those discussed above for FIGS. 13C, 13D and 13E could be used for the circumstances where $0<\eta<\eta^*$ and $\eta$ is increasing (analogous to FIG. 13C), where $\eta^*\leq\eta\leq1$ (analogous to FIG. 13D) and where $0<\eta<\eta^*$ and $\eta$ is decreasing (analogous to FIG. 13E).

The FIG. 13E configuration may last until magnet arrays A1 and C2 are no longer overlapping one another in the stator-x direction, in which case moveable stages 210_1, 210_2 are in the configuration shown in FIG. 13G, which is analogous to that shown in FIG. 13A, where each moveable stage 210_1, 210_2 can be actuated with eight independent forces (i.e. two independent forces (either x and z oriented forces; or y and z oriented forces) on each array 212 of each moveable stage 210).

FIGS. 14A and 14B (collectively FIG. 14) show queuing formations for multiple moveable stages 210 of the FIG. 10 displacement device 250 and methods for moving such moveable stages 210 into and out of such queuing formations according to particular embodiments. A queuing operation may be considered to comprise moving a plurality of moveable stages 210 into queuing formation where the moveable stages 210 are densely packed. It may be desirable for controller 60 to be able to controllably move individual moveable stages 210 into and out of a queuing formation without external (e.g. human or other machine) intervention. In some embodiments, as shown in the illustrated example of FIG. 14A, four (or even more) moveable stages 210 may be queued on a single stator tile 243 (see moveable stages 210_1, 210_2, 210_3, 210_4 or stator tile 243_1 of FIG. 14A). The motion (e.g. position) of each moveable stage 210 queued on stator tile 243_1 is still fully controllable in six degrees of freedom and can be controllably moved (by controller 60) into and out of the queue on stator tile 243_1 as explained in more detail below. In addition to the high density of moveable stages in the FIG. 14A queue, moveable stages 210 on the periphery of the queue can move out of the FIG. 14A queue from four sides (±stator-x and ±stator-y) of the overall queue, instead of only two ends in a conventional linear transportation system. Moveable stages 210 can similarly merge into the queue from four sides of the queue.

As shown in FIG. 14B, 4 moveable stages 210_1, 210_2, 210_3, 210_4 are on a single stator tile 243. Moveable stages 210 may be said to be on a stator tile 243 if their magnet array assemblies overlap the stator tile 243 in the stator-z direction. In the FIG. 14 embodiment, moveable stages 210 and stator tiles 243 have the features of moveable stage 210 and stator tile 243 discussed above in connection with FIG. 10. The x-trace groups and y-trace groups of stator tile 243 are respectively referred to as x-trace groups X1, ..., X8 and y-trace groups Y1, ..., Y8. Due to space 251 between the x-magnet arrays A, C and the y-magnet arrays B, D (see FIG. 10A), controller 60 can controllably move moveable stages into the queue pattern shown in FIG. 14B. In the queue pattern shown in FIG. 14B, a dedicated coil trace group may be used to drive each magnet array in the four moveable stages 210. In the case of moveable stage 210_3 of the FIG. 14B example, currents driven into x-trace group X7 apply force to magnet array A3, currents driven into x-trace group X5 apply force to magnet array C3, currents driven into y-trace group Y2 apply force to magnet array B3 and currents driven into y-trace group Y4 apply force to magnet array D3. None of these coil trace groups (X7, X5, Y3, Y4) are shared with the magnet arrays 212 of other moveable stages 210_1, 210_2, 210_4. In fact, in the FIG. 14B configuration, no two magnet arrays 212 share a coil trace group. All y-magnet arrays have no overlap in the stator y-direction, and all x-magnet arrays have no overlap in the stator-x direction. As a result, two independent forces (either x and z oriented forces; or y and z oriented forces) can be generated on each magnet array 212 and the motion (e.g. position) of each of moveable stages 210 may be controlled with six degrees of freedom.

In the FIG. 14B configuration, moveable stage 210_1 is an outer peripheral moveable stage in the sense that, of the movable stages shown in FIG. 14B, moveable stage 210_1 is the furthest in the negative stator-x direction and the furthest in the negative stator-y direction. Controller 60 may controllably move moveable stage 210_1 in the negative stator-x direction or in the negative stator-y direction to leave the FIG. 14B queue. In some embodiments, for moveable stage 210_1 to leave the queue in the negative stator-x direction, only magnetic arrays A1, B1, and C1 have current driven into their corresponding coil trace groups X3, Y1, X1. No force is needed on magnet array D1 and, in some embodiments, no current need be driven into the coil trace groups corresponding to magnet array D1. This avoids the potential for magnet arrays B3 and D1 to share coil trace groups. In some embodiments, any of the other techniques for addressing shared coil trace groups described herein may be used to drive current into the coil trace groups corresponding to magnet array D1. In some embodiments, as moveable stage 210_1 is being moved out of the queue in the negative stator-x direction, currents may be driven into the coil trace groups X7, Y4, X5 corresponding to magnetic arrays A3, D3, C3 of moveable stage 210_3. No force is needed on magnet array B3 and, in some embodiments, no current need be driven into the coil trace groups corresponding to magnet array B3. This avoids the potential for magnet arrays B3 and D1 to share coil trace groups. In some embodiments, any of the other techniques for addressing shared coil trace groups described herein may be used to drive current into the coil trace groups corresponding to magnet array B3. Similar techniques could be used to controllably move moveable stage 210_1 out of the queue in the negative stator-y direction. Controllably moving moveable stages into the queue is analogous to the procedure of moving moveable stages out of the queue.

In the FIG. 14B configuration, moveable stage 210_3 is an inner peripheral moveable stage in both the stator-x and stator-y directions in the sense that, of the movable stages shown in FIG. 14B, moveable stage 210_3 is on the periphery of the queue, but moveable stage 210_1 is further in the negative stator-x direction and moveable stage 210_4 is further in the positive stator-y direction. When it is desired to move moveable stage 210_3 out of the queue in the positive stator-y direction, the following steps may be used: (1) controllably move outer peripheral movable stage 210_4 out of the queue in the positive stator-y direction (e.g. onto a different stator tile 243 (not shown)) using a technique analogous to that discussed above for moving outer peripheral moveable stage 210_1 out of the queue; (2) controllably move inner peripheral movable stage 210_3 out of the queue in the positive stator-y direction (e.g. onto a different stator tile 243 (not shown)) using a technique analogous to that discussed above for moving outer peripheral moveable stage 210_1 out of the queue; (3) controllably move moveable stages 210_3 and 210_4 to pass one another in the stator-y direction as described above in connection with FIG. 13; (4) controllably move moveable stage 210_4 back into the queue.

Generally, the methods described herein corresponding to FIGS. 12-14 can be applied to moveable stages having other suitable magnet array geometries and stators having other suitable coil trace structures, with suitable modification.

In one embodiment of the invention, three out of four magnet arrays overlap in the stator-z direction with their corresponding coil trace groups and currents are controllably driven into these corresponding coil trace groups to generate forces which may be used to control the motion (e.g. the position) of a moveable stage with six degrees of freedom. In some embodiments, no currents are driven in the coil trace groups corresponding to the fourth magnet array and no corresponding force is generated on the fourth magnet array. In some embodiments, others of the techniques for addressing shared coil trace groups described herein may be used in conjunction with the fourth magnet array.

In one embodiment of the invention, four moveable stages are densely accumulated on a stator coil tile, any two y-magnet arrays of these moveable stages have stator-y direction overlapping width less than $\frac{1}{9}\lambda$, any two x-magnet arrays of these moveable stages have stator x-direction overlapping width less than $\frac{1}{9}\lambda$; each moveable stage overlaps with at least one moveable stage in the stator-x direction with at least $2\lambda$ width, and overlaps with another moveable stage in the stator-y direction with at least $2\lambda$ width; the overall size of the stator tile is not greater than $9\lambda$ by $9\lambda$; each moveable stage can be controlled in 6-DOF.

In one embodiment of the invention, four moveable stages are densely accumulated on a stator coil tile, any two y-magnet arrays of these moveable stages have stator-y direction overlapping width less than $\frac{1}{9}\lambda$, any two x-magnet arrays of these moveable stages have stator-x direction overlapping width less than $\frac{1}{9}\lambda$; each moveable stage overlaps with at least one moveable stage in the stator-x direction with at least $2\lambda$ width, and overlaps with another moveable stage in the stator-y direction with at least $2\lambda$ width; the overall size of the stator tile is not greater than $10\lambda$ by $10\lambda$; each moveable stage can be controlled in 6-DOF.

In one embodiment of the invention, four moveable stages are densely accumulated on a stator coil tile, any two y-magnet arrays of these moveable stages have stator-y direction overlapping width less than $\frac{1}{9}\lambda$, any two x-magnet arrays of these moveable stages have stator-x direction overlapping width less than $\frac{1}{9}\lambda$; each moveable stage overlaps with at least one moveable stage in the stator-x direction with at least $2\lambda$ width, and overlaps with another moveable stage in the stator-y direction with at least $2\lambda$; the overall size of the stator tile is not greater than $8\lambda$ by $8\lambda$; each moveable stage can be controlled in 6-DOF.

In one embodiment of the invention, three moveable stages are densely accumulated on a stator coil tile, any two y-magnet arrays of these moveable stages have stator-y direction overlapping width less than $\frac{1}{9}\lambda$, any two x-magnet arrays of these moveable stages have stator-x direction overlapping width less than $\frac{1}{9}\lambda$; each moveable stage overlaps with at least one moveable stage in the stator-x direction or stator-y direction with at least $2\lambda$ width; the overall size of the stator tile is not greater than $9\lambda$ by $9\lambda$; each moveable stage can be controlled in 6-DOF.

While a number of exemplary aspects and embodiments are discussed herein, those of skill in the art will recognize certain modifications, permutations, additions and sub-combinations thereof. For example:

In this description and the accompanying claims, elements (such as, by way of non-limiting example, stator layers, coil traces, moveable stages and/or magnet arrays) are said to overlap one another in or along a direction. For example, coil traces 32, 34 from different stator layers 40, 42 may overlap one another in or along the stator-direction. When it is described that two or more objects overlap in or along the z-direction, this usage should be understood to mean that a z-direction-oriented line could be drawn to intersect the two or more objects.

In many of the drawings and much of the description provided herein, moveable stages are shown as being static with their stage-x, stage-y and stage-z axes being the same as the stator-x, stator-y and stator-z axes of the corresponding stator. This custom is adopted in this disclosure for the sake of brevity and ease of explanation. It will of course be appreciated from this disclosure that a moveable stage can (and is designed to) move with respect to its stator, in which case the stage-x, stage-y, stage-z axes of the moveable stage may no longer be the same as (or aligned with) the stator-x, stator-y and stator-z axes of its stator. Directions, locations and planes defined in relation to the stator axes may generally be referred to as stator directions, stator locations and stator planes and directions, locations and planes defined in relation to the stage axes may be referred to as stage directions, stage locations and stage planes.

In the description above, stators comprise current carrying coil traces and moveable stages comprise magnet arrays. It is of course possible that this could be reversed—i.e. stators could comprise magnet arrays and moveable stages could comprise current carrying coil traces. Also, whether a component (e.g. a stator or a moveable stage) is actually moving or whether the component is actually stationary will depend on the reference frame from which the component is observed. For example, a stator can move relative to a reference frame of a moveable stage, or both the stator and the moveable stage can move relative to an external reference frame. Accordingly, in the claims that follow, the terms stator and moveable stage and references thereto (including references to stator and/or stage x, y, z-directions, stator and/or stage x, y, z-axes and/or the like) should not be interpreted literally unless the context specifically requires literal interpretation Moreover, unless the context specifically requires, it should be understood that the moveable stage (and its directions, axes and/or the like) can move relative to the stator (and its directions, axes and/or the like) or that the stator (and its directions, axes and/or the like) can move relative to a moveable stage (and its directions, axes and/or the like).

In this description and the accompanying claims, references are made to controlling, controlling the motion of and/or controlling the position of moveable stages in or with multiple (e.g. 6) degrees of freedom. Unless the context or the description specifically indicates otherwise, controlling, controlling the motion of and/or controlling the position of moveable stages in or with multiple degrees of freedom may be understood to mean applying feedback position control in the multiple degrees of freedom, but does not expressly require that there be motion of moveable stage in any such degree of freedom While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A displacement device for moving a plurality of moveable stages relative to a stator, the displacement device comprising:
   a stator comprising one or more stator tiles, each stator tile comprising:
      an x-trace layer comprising a plurality of x-trace groups, each x-trace group comprising a plurality of electrically conductive x-traces which extend in a stator-x direction across the stator tile and into which currents may be independently driven;
      a y-trace layer comprising a plurality of y-trace groups, each y-trace group comprising a plurality of electrically conductive y-traces which extend in a stator-y direction across the stator tile and into which currents may be independently driven;
      the x-trace layer and the y-trace layer overlapping one another in a stator-z direction;
      the stator-x direction and the stator-y direction non-parallel to one another;
   a plurality of moveable stages, each moveable stage comprising:
   a first magnet array comprising a plurality of first magnetization segments, each first magnetization segment having a corresponding magnetization direction; and
   a controller connected to one or more amplifiers for driving currents in the x-traces and the y-traces, the controller and the one or more amplifiers configured to drive currents in the x-traces and the y-traces to move a first moveable stage and a second moveable stage relative to the stator where the first magnet array of the first moveable stage overlaps with the first magnet array of the second moveable stage in the stator-x direction, wherein, for driving currents in the x-traces and the y-traces to move the first moveable stage and the second moveable stage relative to the stator, the controller and the one or more amplifiers are configured, for at least a first portion of a time where the first magnet array of the first moveable stage overlaps with the first magnet array of the second moveable stage in the stator-x direction, to controllably drive first x-trace group currents in a first x-trace group that overlaps with a first portion of the first magnet array of the first moveable stage in the stator-z direction and a first portion of the first magnet array of the second moveable stage in the stator-z direction, the first x-trace group currents determined, by the controller, based at least in part on positions of both the first moveable stage and the second moveable stage and whereby the first x-trace group currents generate first forces on the first magnet array of the first moveable stage and on the first magnet array of the second moveable stage.

2. A displacement device according to claim 1 wherein at least two of the first magnetization segments having magnetization directions that are different from one another.

3. A displacement device according to claim 2 wherein the plurality of first magnetization segments are linearly elongated in the stage-x direction, each first magnetization segment having a corresponding magnetization direction orthogonal to the stage-x direction.

4. A displacement device according to claim 3 wherein each moveable stage comprises:
   a second magnet array comprising a plurality of second magnetization segments linearly elongated in a stage-y direction, each second magnetization segment having a magnetization direction orthogonal to the stage-y direction and at least two of the second magnetization segments having magnetization directions that are different from one another;
   a third magnet array comprising a plurality of third magnetization segments linearly elongated in the stage-x direction, each third magnetization segment having a corresponding magnetization direction orthogonal to the stage-x direction and at least two of the third magnetization segments having magnetization directions that are different from one another; and
   the stage-x direction and the stage-y direction non-parallel to one another.

5. A displacement device according to claim 1 wherein the controller and the one or more amplifiers are configured, for at least the first portion of the time where the first magnet array of the first moveable stage overlaps with the first magnet array of the second moveable stage in the stator-x direction, to controllably drive second x-trace group currents in a second x-trace group that overlaps with a second portion of the first magnet array of the first moveable stage in the stator-z direction and a second portion of the first magnet array of the second moveable stage in the stator-z direction, the second x-trace group currents determined, by the controller, based at least in part on positions of both the first moveable stage and the second moveable stage and whereby the second x-trace group currents generate second forces on the first magnet array of the first moveable stage and on the first magnet array of the second moveable stage.

6. A displacement device to claim 5 wherein the controller and the one or more amplifiers are configured to drive currents in the x-traces and the y-traces to move the first moveable stage and the second moveable stage relative to the stator where the third magnet array of the first moveable stage overlaps with the third magnet array of the second moveable stage in the stator-x direction, wherein, for driving currents in the x-traces and the y-traces to move the first moveable stage and the second moveable stage relative to the stator, the controller and the one or more amplifiers are configured:

for at least a first portion of a time where the third magnet array of the first moveable stage overlaps with the third magnet array of the second moveable stage in the stator-x direction, to controllably drive third x-trace group currents in a third x-trace group that overlaps with a first portion of the third magnet array of the first moveable stage in the stator-z direction and a first portion of the third magnet array of the second moveable stage in the stator-z direction, the third x-trace group currents determined, by the controller, based at least in part on positions of both the first moveable stage and the second moveable stage and whereby the third x-trace group currents generate first forces on the third magnet array of the first moveable stage and on the third magnet array of the second moveable stage; and for at least the first portion of the time where the third magnet array of the first moveable stage overlaps with the third magnet array of the second moveable stage in the stator-x direction, to controllably drive fourth x-trace group currents in a fourth x-trace group that overlaps with a second portion of the third magnet array of the first moveable stage in the stator-z direction and a second portion of the third magnet array of the second moveable stage in the stator-z direction, the fourth x-trace group currents determined, by the controller, based at least in part on positions of both the first moveable stage and the second moveable stage and whereby the fourth x-trace group currents generate second forces on the third magnet array of the first moveable stage and on the third magnet array of the second moveable stage.

7. A displacement device according to claim 1 wherein, for driving currents in the x-traces and the y-traces to move the first moveable stage and the second moveable stage relative to the stator, the controller and the one or more amplifiers are configured, for at least a second portion of the time where the first magnet array of the first moveable stage overlaps with the first magnet array of the second moveable stage in the stator-x direction, to refrain from driving currents in the first x-trace group.

8. A displacement device according to claim 5 wherein, for driving currents in the x-traces and the y-traces to move the first moveable stage and the second moveable stage relative to the stator, the controller and the one or more amplifiers are configured, for at least a second portion of the time where the first magnet array of the first moveable stage overlaps with the first magnet array of the second moveable stage in the stator-x direction, to drive currents in the first x-trace group and the second x-trace group which are the same as one another.

9. A displacement device according to claim 1 wherein, during the first portion of the time where the first magnet array of the first moveable stage overlaps with the first magnet array of the second moveable stage in the stator-x direction, the positions of the first moveable stage and the second moveable stage satisfy a condition $0<\eta_1<\eta_1^*$, where: $\eta_1$ is a first magnet array overlap factor which represents a fraction of the widths $W_{my}$ of the first magnet arrays of the first and second moveable stages that overlap with one another in the stator-x direction; and $\eta_1^*$ is a first overlap threshold.

10. A displacement device according to claim 9 wherein the controller is configured, during the first portion of the time where the first magnet array of the first moveable stage overlaps with the first magnet array of the second moveable stage in the stator-x direction, to determine the first x-trace group currents based on a proportion $(1-\eta_1/2)$ of a stage-y dimension of the first magnet array of the first moveable stage that overlaps with the first x-trace group in the stator-z direction and based on a proportion $\eta_1/2$ of a stage-y dimension of the first magnet array of the second moveable stage that overlaps with the first x-trace group in the stator-z direction.

11. A displacement device according to claim 7 wherein:
during the first portion of the time where the first magnet array of the first moveable stage overlaps with the first magnet array of the second moveable stage in the stator-x direction, the positions of the first moveable stage and the second moveable stage satisfy a condition $0<\eta_1<\eta_1^*$, where: $\eta_1$ is a first magnet array overlap factor which represents a fraction of the widths $W_{my}$ of the first magnet arrays of the first and second moveable stages that overlap with one another in the stator-x direction; and $\eta_1^*$ is a first overlap threshold; and
during the second portion of the time where the first magnet array of the first moveable stage overlaps with the first magnet array of the second moveable stage in the stator-x direction, the positions of the first moveable stage and the second moveable stage satisfy a condition $\eta_1^* \leq \eta_1 \leq 1$ where $\eta_1$ is the first magnet array overlap factor.

12. A displacement device according to claim 11 wherein the second portion of the time where the first magnet array of the first moveable stage overlaps with the first magnet array of the second moveable stage in the stator-x direction occurs after the first portion of the time where the first magnet array of the first moveable stage overlaps with the first magnet array of the second moveable stage in the stator-x direction and wherein, after the second portion of the time where the first magnet array of the first moveable stage overlaps with the first magnet array of the second moveable stage in the stator-x direction, there is a third portion of the time where the first magnet array of the first moveable stage overlaps with the first magnet array of the second moveable stage in the stator-x direction and wherein, during the third portion of the time where the first magnet array of the first moveable stage overlaps with the first magnet array of the second moveable stage in the stator-x direction, the controller and the one or more amplifiers are configured to controllably drive first x-trace group currents in the first x-trace group, determined by the controller, based at least on part the on positions of both the first moveable stage and the second moveable stage; and
wherein, during the first portion of the time where the first magnet array of the first moveable stage overlaps with the first magnet array of the second moveable stage in the stator-x direction, the first magnet array overlap factor $\eta_1$ is increasing over time and during the third portion of the time where the first magnet array of the first moveable stage overlaps with the first magnet array of the second moveable stage in the stator-x direction, the first magnet array overlap factor m is decreasing over time.

13. A displacement device according to claim 9 wherein the controller is configured to determine the first magnet array overlap factor m based on feedback.

14. A displacement device according to claim 1 wherein, for driving currents in the x-traces and the y-traces to move the first moveable stage and the second moveable stage relative to the stator where the first magnet array of the first moveable stage overlaps with the first magnet array of the second moveable stage in the stator-x direction, the controller and the one or more amplifiers are configured to:

controllably drive first y-trace group currents in a first y-trace group that overlaps with the second magnet array of the first moveable stage in the stator-z direction, the first y-trace group currents determined, by the controller, based on the position of the first moveable stage and independent of the position of the second moveable stage;

controllably drive second y-trace group currents in a second y-trace group that overlaps with the second magnet array of the second moveable stage in the stator-z direction, the second y-trace group currents determined, by the controller, based on the position of the second moveable stage and independent of the position of the first moveable stage.

15. A displacement device according to claim 1 wherein the positions of both the first moveable stage and the second moveable stage are determined based on feedback.

16. A displacement device according to claim 1 wherein an area of the first portion of the first magnet array of the first moveable stage has a size $P_1$ and an area of the first portion of the first magnet array of the second moveable stage has a size $P_2$ and wherein the controller is configured to determine the first x-trace group currents based on a weighted force F, which depends on the areas $P_1$ and $P_2$.

17. A displacement device according to claim 16 wherein the controller is configured to determine the first x-trace group currents based on the weighted force $F_w$ and also based on forces $F_1$ and $F_2$ desired to be applied to the first magnet array of the first moveable stage and the first magnet array of the second moveable stage respectively, the desired forces $F_1$ and $F_2$ dictated by a control algorithm and based on the positions of the first and second moveable stages.

18. A displacement device according to claim 1 wherein the first x-trace group currents determined, by the controller, are based at least in part on feedback from one or more sensors.

19. A displacement device according to claim 18 wherein the one or more sensors comprise a plurality of sensors distributed in an array in a plane extending in the stator-x direction and the stator-y direction with a normal direction in the stator z-direction.

20. A displacement device for moving a plurality of moveable stages relative to a stator, the displacement device comprising:

a stator comprising one or more stator tiles, each stator tile comprising:

an x-trace layer comprising a plurality of x-trace groups, each x-trace group comprising a plurality of electrically conductive x-traces which extend in a stator-x direction across the stator tile and into which currents may be independently driven;

a y-trace layer comprising a plurality of y-trace groups, each y-trace group comprising a plurality of electrically conductive y-traces which extend in a stator-y direction across the stator tile and into which currents may be independently driven;

the x-trace layer and the y-trace layer overlapping one another in a stator-z direction;

the stator-x direction and the stator-y direction non-parallel to one another;

a plurality of moveable stages, each moveable stage comprising:

a first magnet array comprising a plurality of first magnetization segments, each first magnetization segment having a corresponding magnetization direction; and a controller connected to one or more amplifiers for driving currents in the x-traces and the y-traces, the controller and the one or more amplifiers configured to drive currents in the x-traces and the y-traces to move a first moveable stage and a second moveable stage relative to the stator where the first magnet array of the first moveable stage overlaps with the first magnet array of the second moveable stage in the stator-x direction, wherein, for driving currents in the x-traces and the y-traces to move the first moveable stage and the second moveable stage relative to the stator, the controller and the one or more amplifiers are configured, for at least a first portion of a time where the first magnet array of the first moveable stage overlaps with the first magnet array of the second moveable stage in the stator-x direction, to controllably drive first x-trace group currents in a first x-trace group that overlaps with a first portion of the first magnet array of the first moveable stage in the stator-z direction and a first portion of the first magnet array of the second moveable stage in the stator-z direction, the first x-trace group currents determined, by the controller, based at least in part on feedback from one or more sensors and whereby the first x-trace group currents generate first forces on the first magnet array of the first moveable stage and on the first magnet array of the second moveable stage.

* * * * *